US010854189B2

(12) United States Patent
Feinstein et al.

(10) Patent No.: US 10,854,189 B2
(45) Date of Patent: Dec. 1, 2020

(54) TECHNIQUES FOR MODEL TRAINING FOR VOICE FEATURES

(71) Applicant: Amazon Technologies, Inc., Seattle, WA (US)

(72) Inventors: Jonathan B. Feinstein, Sebastopol, CA (US); Alok Verma, Fremont, CA (US); Amina Shabbeer, San Francisco, CA (US); Brandon Scott Durham, Seattle, WA (US); Catherine Breslin, Cambridge (GB); Edward Bueche, Pleasanton, CA (US); Fabian Moerchen, Bainbridge, WA (US); Fabian Triefenbach, Meschede (DE); Klaus Reiter, Aachen (DE); Toby R. Latin-Stoermer, Seattle, WA (US); Panagiota Karanasou, Cambridge (GB); Judith Gaspers, Frechen (DE)

(73) Assignee: Amazon Technologies, Inc., Seattle, WA (US)

(*) Notice: Subject to any disclaimer, the term of this patent is extended or adjusted under 35 U.S.C. 154(b) by 67 days.

(21) Appl. No.: 16/139,984

(22) Filed: Sep. 24, 2018

(65) Prior Publication Data
US 2020/0098351 A1 Mar. 26, 2020

(51) Int. Cl.
G10L 15/00 (2013.01)
G10L 15/06 (2013.01)
(Continued)

(52) U.S. Cl.
CPC ............ G10L 15/005 (2013.01); G06F 40/58 (2020.01); G10L 15/02 (2013.01); G10L 15/063 (2013.01); G10L 2015/0631 (2013.01)

(58) Field of Classification Search
CPC ......... G06F 40/263; G06F 40/40; G10L 15/18
See application file for complete search history.

(56) References Cited

U.S. PATENT DOCUMENTS 8,260,615 B1   9/2012 Nakajima et al.
8,374,865 B1   2/2013 Biadsy et al.
(Continued)

FOREIGN PATENT DOCUMENTS

CN     106023985     10/2016

OTHER PUBLICATIONS

PCT/US2019/052736, "International Search Report and Written Opinion", dated Jan. 8, 2020, 13 pages.
(Continued)

Primary Examiner — Daniel Abebe
(74) Attorney, Agent, or Firm — Kilpatrick Townsend & Stockton LLP

(57) ABSTRACT

Techniques are provided for training a language recognition model. For example, a language recognition model may be maintained and associated with a reference language (e.g., English). The language recognition model may be configured to accept as input an utterance in the reference language and to identify a feature to be executed in response to receiving the utterance. New language data (e.g., other utterances) provided in a different language (e.g., German) may be obtained. This new language data may be translated to English and utilized to retrain the model to recognize reference language data as well as language data translated to the reference language. Subsequent utterances (e.g., English utterances, or German utterances translated to English) may be provided to the updated model and a feature may be identified. One or more instructions may be sent to a user device to execute a set of instructions associated with the feature.

21 Claims, 10 Drawing Sheets

(51) Int. Cl.
*G10L 15/02* (2006.01)
*G06F 40/58* (2020.01)

(56) References Cited

U.S. PATENT DOCUMENTS

| | | | |
|---|---|---|---|
| 9,424,254 B2 | 8/2016 | Howald et al. | |
| 9,721,559 B2 | 8/2017 | Cui et al. | |
| 10,067,939 B2 | 9/2018 | Na et al. | |
| 2007/0271088 A1* | 11/2007 | Waibel | G06F 40/263 |
| | | | 704/9 |
| 2010/0088085 A1* | 4/2010 | Jeon | G06F 40/44 |
| | | | 704/7 |
| 2013/0073276 A1* | 3/2013 | Sarikaya | G06F 40/58 |
| | | | 704/2 |
| 2013/0151235 A1 | 6/2013 | Och et al. | |
| 2015/0051897 A1* | 2/2015 | Waibel | G06F 40/44 |
| | | | 704/2 |
| 2015/0127319 A1 | 5/2015 | Hwang et al. | |
| 2016/0117316 A1* | 4/2016 | Le | G10L 15/16 |
| | | | 704/9 |
| 2017/0139905 A1* | 5/2017 | Na | G10L 15/16 |
| 2017/0371866 A1 | 12/2017 | Eck | |
| 2019/0163747 A1 | 5/2019 | Kang et al. | |

OTHER PUBLICATIONS

U.S. Appl. No. 16/139,891, filed Sep. 24, 2018 Titled "Techniques for Model Training for Voice Features".

* cited by examiner

US 10,854,189 B2

TECHNIQUES FOR MODEL TRAINING FOR VOICE FEATURES

BACKGROUND

Many devices today utilize voice recognition to identify features to be executed by the device. Conventionally, a language recognition model may be utilized to process an utterance (e.g., a voice sample) of the user and identify the feature to be executed. Language recognition models are conventionally trained to utilize utterances in a particular language. The training of these types of models can include extensive human labor to generate training data for potential utterances as well as to associate these utterances with corresponding attributes (e.g., the feature to be executed). Conventional techniques require similar human efforts to train a new model in a different language. These human trainers typically have specialized language and science skills. Training language recognition models can be time-consuming and cumbersome work involving specialized personnel.

BRIEF DESCRIPTION OF THE DRAWINGS

Various embodiments in accordance with the present disclosure will be described with reference to the drawings, in which.

DETAILED DESCRIPTION

Figure 1:
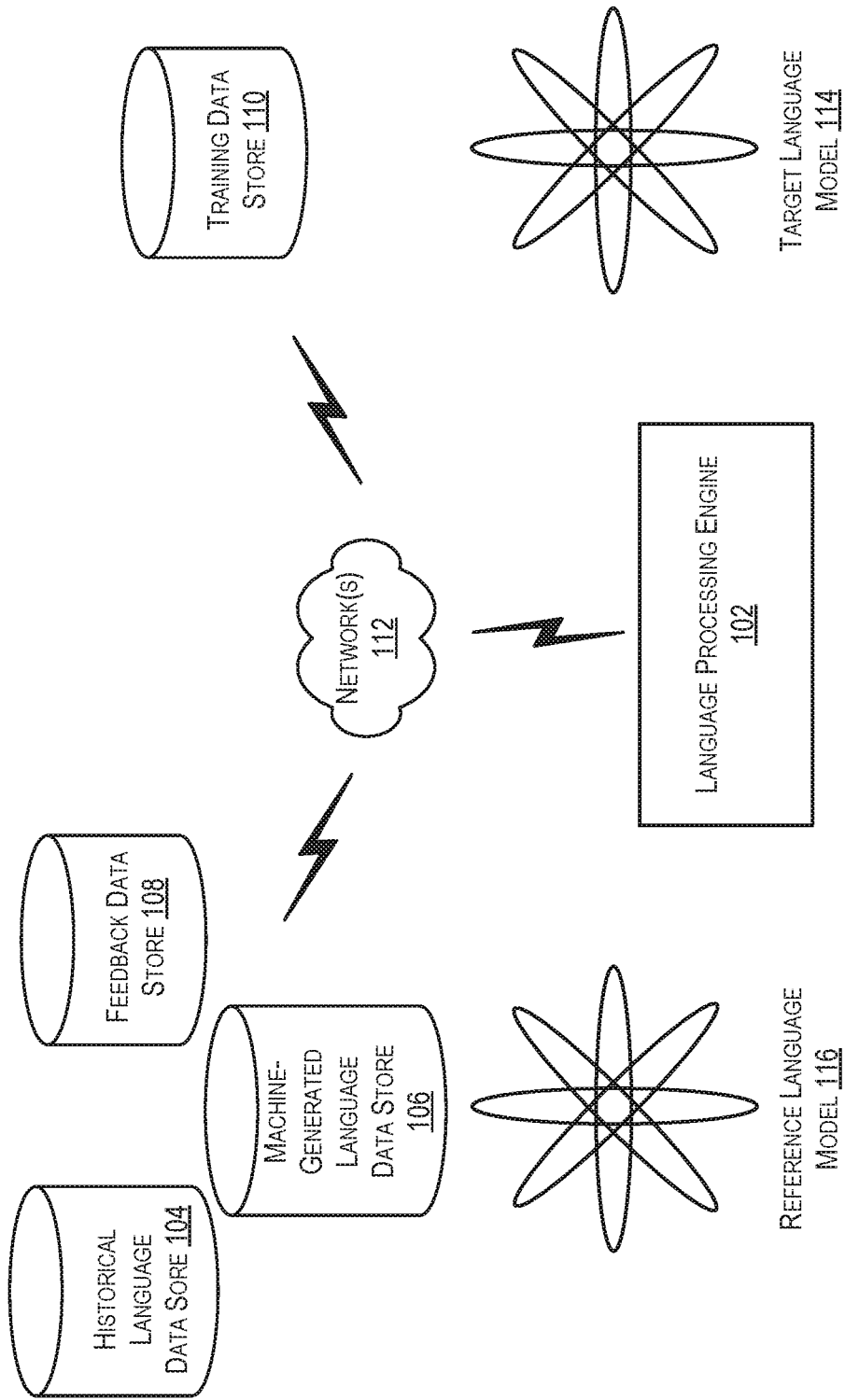
FIG. 1 is a schematic diagram illustrating an example environment suitable for implementing aspects of an language processing engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are, in part, directed to training a target language model to recognize input provided in a target language utilizing data associated with a reference language model trained to recognize input provided in a different language. Techniques for modifying a language recognition model to identify input provided in more than one language are also discussed. A "language recognition model" (also referred to as a "language model") may utilize any suitable natural language processing techniques to ascertain the meaning of an utterance (e.g., a voice sample containing one or more spoken words). These techniques may include part-of-speech tagging, parsing, word segmentation, semantical intent analysis, sentiment analysis, topic segmentation, or the like. As used herein, a "reference language model" may include a language model that has been trained to recognize input provided in a reference language (e.g., English, French, Japanese, German, etc.). Similarly, a "target language model" may include a language model that is trained, or in the process of being trained, to recognize input provided in a target language (e.g., English, French, Japanese, German, etc.) that is different from the reference language. By way of example, a reference language model may be trained to recognize English utterances. Techniques provided herein may include training a target language model to recognize German utterances, for example, utilizing at least some portion of data associated with the English language model.

As part of the process for enabling the techniques described herein, the language processing engine may be configured to train a target language model utilizing data associated with a reference language model. By way of example, the language processing engine may be configured to obtain historical language data and/or machine-generated language data associated with a reference language model. An instance of historical language data may include a reference language (English) utterance provided in the past, one or more attributes associated with reference language utterance, device data related to the utterance, or any suitable data corresponding to the utterance. As a non-limiting example, an utterance such as "I want to hear Artist X" may be stored as an instance of historical language data with attributes indicating that "I want to hear" is contextually related and that "Artist X" may correspond to a particular artist. One or more additional attributes of the historical language data may indicate a feature that is associated with the utterance. For example, the utterance "I want to hear Artist X" may be associated with a particular feature such as "play songs by artist." A feature may relate to a set of instructions to be executed by the device to perform a particular function. In this example, a vocal input of "I want to hear Artist X" may result in the device playing one or more songs stored at the device that are related to a particular artist (e.g., "Artist X"). Device data associated with the utterance may include any suitable data related to the device (e.g., user interface selections, user interactions with the device, additional received vocal input, actions performed by the device, etc.). In some embodiments, the device data associated with the utterance may be time-based. For example, the device data associated with a particular utterance may include any suitable device data occurring a particular time period (e.g., 30 seconds, 60 seconds, 5 minutes, 1 month, etc.) subsequent to receiving vocal input including the utterance.

In some embodiments, historical language data may be originally provided, at least in part, by human trainers. For example, some historical language data may include utterances and/or attributes that were identified, at least in part, by a human during a training process for a reference language model. Once deployed, the reference language model may receive user provided utterances which may be considered new instances of historical language data. The attributes associated with these new utterances in some instances may be provided by a human trainer or at least some of these attributes may be machine annotated. As used herein, "machine-generated language data" may include one or more instances of historical language data for which at least one attribute was machine generated. As a non-limiting example, an instance of machine-generated language data may include an utterance provided by a user of a device, with an attribute identifying a related feature that was provided by a machine (e.g., the device, a different computing device, etc.).

The language processing engine may be configured to utilize any suitable combination of historical language data and/or machine-generated language data to generate a training set for a target language model. In some embodiments, the historical and/or machine-generated language data may be in English, while the target language model is to be trained to recognize French utterances (or utterances of another target language). The English historical language data and/or machine-generated language data may be machine translated from English to French to generate a training set for the French language model. A number of quality checks may be executed by the language processing engine to ensure the target language model exhibits some threshold degree of accuracy before being deployed to users. These quality checks are discussed in further detail with respect to the following figures. Additional training data may also be generated by the language processing engine as will be discussed further with respect to FIG. 2. Utilizing the techniques described herein, historical language data and/or machine-generated language data of a first model may be leveraged to produce training data of a second model. This may result in a decrease in an amount of human effort and time needed to train the second model to recognize utterances and to identify the corresponding feature to be executed with some degree of accuracy (e.g., over 80% accuracy, over 90% accuracy, etc.). These language models may continue to be automatically updated as new historical language data is received, which improves the accuracy of the model without requiring additional human effort or specialized personnel.

In another embodiment, the language processing engine may be configured to train a language recognition model to recognize utterances that were initially provided in different languages (e.g., English or German). For example, the language processing engine may receive an utterance provided in a target language (e.g., German). The language processing engine may machine translate the utterance to a reference language (e.g., English). The translated utterance may be utilized to retrain a language recognition model that may have been initially trained to recognize English utterances. Accordingly, the language processing engine may, over time, train the language recognition model to identify English utterances as well as machine-translated German utterances.

Once trained, any suitable language recognition model (also referred to as a language model for brevity) discussed herein may be utilized to interpret subsequently received user input (e.g., user-provided utterances). The utterance may be provided to the language model as input. The language model may analyze the utterance to interpret and/or analyze the utterance. In some embodiments, the language model may output language data corresponding to the utterance. By way of example, the language model may output a feature identifier associated with the utterance. Alternatively, the language model may output a set of instructions associated with a particular feature and/or particular operations to be performed by the user device in response to receiving the utterance. The feature identifier and/or set of instructions may be provided to the user device which may cause the user device to execute the operations associated with the feature identifier and/or the set of instructions provided in order to perform a particular function.

The language processing engine may be configured to monitor device data to identify actions and/or inactions of the user, actions performed by the device, or any suitable information related to device operations during a time period immediately following receipt of the utterance. The language processing engine may analyze the device data (utilizing predetermined success criteria associated with the feature) to determine instances in which the utterance was misunderstood and/or the feature associated with the utterance appears to be incorrect. These instances may be determined based at least in part on success scores calculated by the language processing engine to quantify the success of recognizing the utterance correctly, and/or executing the correct feature as appropriate. In some embodiments, the language processing engine may illicit feedback from the user regarding the utterance and/or the feature executed. Based at least in part on the determined success scores and/or the feedback from the user, the language processing engine may include or exclude the language data corresponding to the utterance from subsequent training data utilized to retrain the language model over time.

FIG. 1 is a schematic diagram illustrating an example environment 100 suitable for implementing aspects of an language processing engine, in accordance with at least one embodiment. Environment 100 includes a language processing engine 102 configured to communicate with one or more data stores such as historical language data store 104, machine-generated language data store 106, feedback data store 108, and training data store 110. In some embodiments, the data stores 104-110 may be accessible to the language processing engine 102 (e.g., locally, and/or via an intranet), and/or the data stores 104-110 may be accessible to the language processing engine 102 via network(s) 112. The network(s) 112 may include any one or a combination of many different types of networks, such as cable networks, the Internet, wireless networks, cellular networks, and other private and/or public networks.

In some embodiments, the language processing engine 102, or some part of the language processing engine 102 may operate on a user device and/or at a server computer. In some embodiments, the language processing engine 102 may perform operations to train a target language model 114 from data associated with a previously trained model (e.g., reference language model 116. The language processing engine 102 may perform any suitable operations to perform a training process to identify and/or generate training data for training data store 110. In some embodiments, the language processing engine 102 may maintain any suitable number of language models (e.g., language recognition models) corresponding to any suitable number of languages. That is, the language processing engine 102 may maintain an English language model trained to recognize English utterances and to identify a feature corresponding to an English utterance and/or a German language model may be maintained that is trained to recognize German utterances and to identify a feature corresponding to a German utterance. Each model may correspond to a particular language.

According to some embodiments, the language processing engine 102 may be configured to select a particular reference language model (e.g., reference language model 116) from any suitable number of maintained reference language models. By way of example, the language processing engine 102 may identify that data associated with an English language model is to be utilized to train a German language model rather than data associated with a Korean language model due to the English and German languages being more similar than Korean and German languages. In some embodiments, the language processing engine 102 may identify the reference language model 116 (and its associated data) to be utilized based at least in part on a predetermined protocol set indicating similarity assessments between to two or more languages. In some embodiments, the predetermined protocol set may include a number of predetermined rules that identify a particular reference language model to be utilized when training a particular target language model. Accordingly, in some embodiments, the reference language and the target language are different languages, and the reference language model 116 and the target language model 114 are separate language models.

According to some embodiments, the language processing engine may utilize historical language data obtained from the historical language data store 104 and machine-generated language data obtained from the machine-generated language data store 106 to generate training data for training data store 110. The data within training data store 110 may be subsequently utilized to train the target language model 114. As discussed herein, the historical language data may include language data (e.g., utterances, language data attribute(s), a feature identifier, device data, etc.) for which at least a portion of the language data was provided by a human. Similarly, the machine-generated language data may include language data (e.g., utterances, language data attribute(s), a feature identifier, device data, etc.) for which at least a portion of the language data was provided by a machine. In some embodiments, the historical language data and the machine-generated language data may be maintained in separate data containers (e.g., historical language data store 104 and machine-generated language data store 106) and/or separate data objects (e.g., a data object for historical language data provided by a human and a separate data object for machine-generated language data). In other embodiments, the historical language data and the machine-generated language data corresponding to a common utterance may be maintained in a common container (e.g., a single data store) and/or a common data object.

The language processing engine 102 may be configured to machine translate the historical language data and/or the machine-generated language data from a reference language (e.g., English) to a target language (e.g., German). This machine-translated data may be stored in training data store 110 and/or utilized, at least in part, to train the target language model 114 to recognize German utterances and corresponding features to be executed upon recognition of particular German utterances. The process for training a target language model from data associated with a reference language model is discussed in more detail with respect to FIG. 2.

Although FIG. 1 depicts separate language models being maintained, it should be appreciated that in some embodiments, the language processing engine 102 may be configured to train a single model to recognize utterances provided in more than one language. In these embodiments, the language processing engine 102 may obtain training data including historical and/or machine-generated language data, and/or user-provided utterances associated with one language (e.g., German) to retrain a language model previously trained to recognize utterances of a different language (e.g., English). The language processing engine 102 may machine translate the German utterances of the training data in order to generate translated language data with which the English language model may be updated. Accordingly, users of devices that may access the functionality of the language processing engine 102 may provide utterances in English and/or German and a common language model may be utilized to interpret the utterances. Additional information regarding these embodiments is discussed below with respect to FIG. 3.

Figure 2:
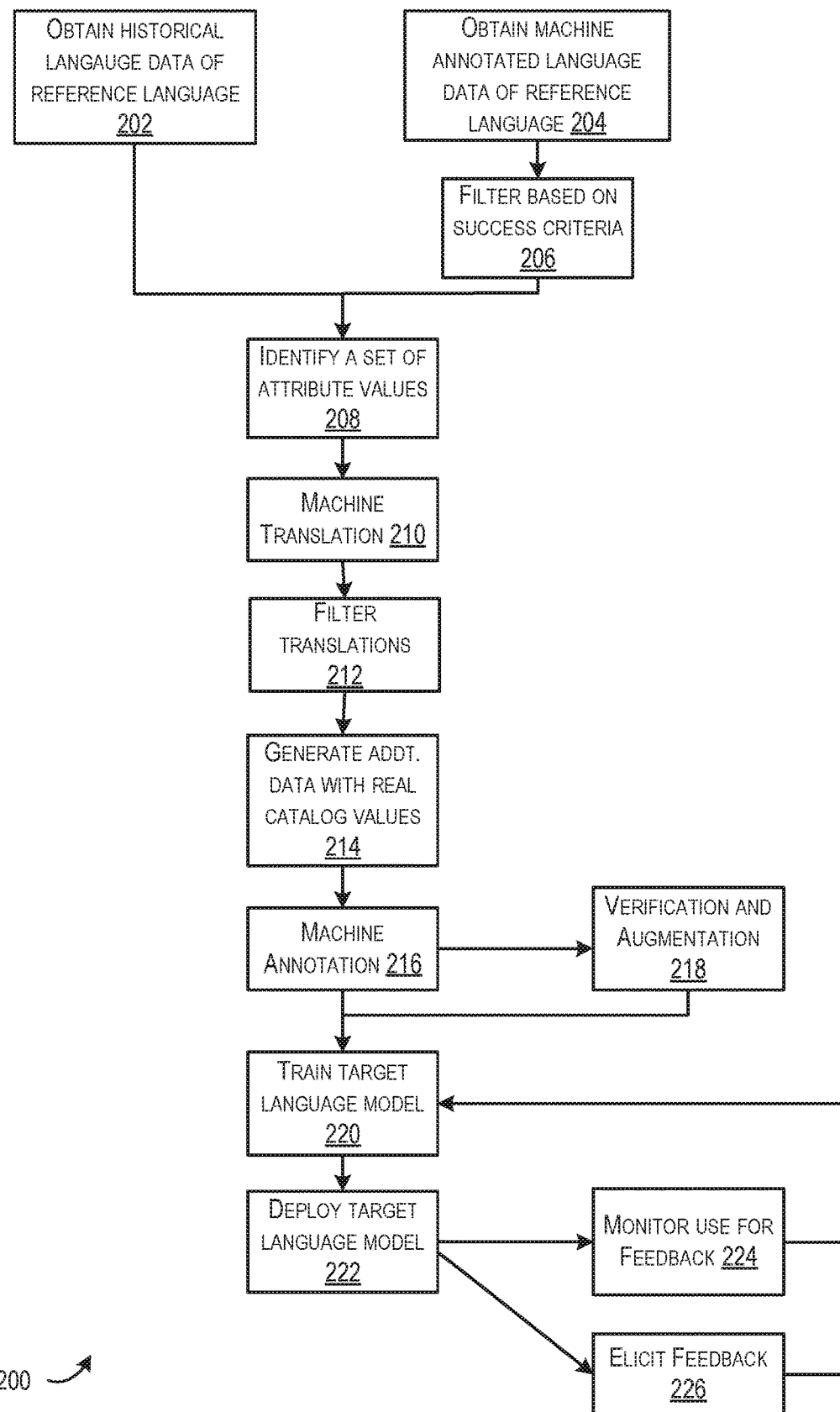
FIG. 2 is a block diagram illustrating an example method for training a target language model utilizing the language processing engine of FIG. 1, in accordance with at least one embodiment.

FIG. 2 is a block diagram illustrating an example method 200 for training a target language model (e.g., the target language model 114 of FIG. 1 utilizing the language processing engine 102 of FIG. 1), in accordance with at least one embodiment. The method 200 may be performed by the language processing engine 102 at least in part at a user device (e.g., a smartphone, a media player, a voice-controlled intelligent personal assistant device, speakers, etc.) and/or at least in part at a server computer. Accordingly, the reference and/or target language models discussed herein may reside at a user device and/or at a server computer.

At 202, historical language data" of the reference language may be obtained. The annotated data may include training data generated at least in part by humans and/or user-provided utterances previously provided to a device that utilized a previously trained reference language model (e.g., an English model). For example, the historical language data may be initially generated by human operators. A data object (or another suitable container) may store an utterance that was manually identified by a human operator, and/or one or more attributes related to an utterance that were manually identified by a human operator, and/or one or more features related to the utterance that were manually identified by a human operator. As another example, historical language data may include an utterance that was provided vocally at a user device. If the utterance was provided at a user device, the historical language data may include attributes associated with the utterance that were provided by a human operator. The historical language data may be stored in any suitable manner, utilizing any suitable number and/or type of data storage container, utilizing any suitable number and/or type of data objects. In some embodiments, the historical language data may be stored in a database, object, mapping, or any suitable storage container with which associations between utterances, attributes, features, and/or device data may be maintained.

At 204, the language processing engine 102 may obtain machine-annotated language data of the reference language. The machine-annotated language data may be an example of the machine-generated language data described in connection with FIG. 1. In some embodiments, an instance of the machine-annotated language data may include an utterance of a reference language (e.g., an English phrase provided by a human and/or spoken at a user device) for which at least one attribute associated with the utterance was machine generated.

A process for providing a machine-generated annotation (e.g., attribute associated with an utterance) is now described. In some embodiments, a reference language model (or another suitable model) may be utilized to determine the content of an utterance. The same model may be configured to determine one or more attributes of the utterance and/or one or more features to which the utterance likely relates. For clarity, a model utilized for making these type of determinations may be referred to as an "annotation model." The annotation model may be a stand-alone language recognition model, or the functionality of the annotation model may be provided as part of the reference language model 116 of FIG. 1 and/or the target language model 114 of FIG. 1. The annotation model may be configured to utilize any suitable natural language processing techniques to identify that one or more portions of an utterance relate to one or more attribute categories and/or values. The annotation model may be trained utilizing any suitable supervised and/or unsupervised learning techniques utilizing historical data for which annotations (e.g., utterance/attribute associations) are known. Once trained, the annotation model may then be provided new utterances for which it may determine any suitable number of attributes (e.g., categories and/or values) corresponding to the provided utterance.

As a non-limiting example, an utterance including the words "Call Mom" may be provided to the annotation model. The annotation model may be trained to identify that the word "call" may correspond to a feature such as "make a telephone call," and that "Mom" corresponds to a person (e.g., a particular stored contact associated with contact information). In some embodiments, the feature may correspond to a set of device instructions and/or operations to be performed by the user device. A computing device associated with the annotation model (e.g., the language processing engine 102), may be configured to receive the identified attributes as output from the annotation model and may update a data object associated with the utterance to include those attributes. By way of example, the language processing engine 102 may update a data object for the utterance "Call Mom" to include an attribute that identifies an association with the feature "make a telephone call" and an attribute that indicates a subject "Mom." Any suitable number and type of attributes may be identifiable by the annotation model. These attributes may indicate characteristics of the utterance and/or a portion of the utterance and/or the attributes may indicate associations between the utterance and/or a portion of the utterance and additional data. It should be appreciated that any suitable techniques for determining associations between the utterance and/or a portion of the utterance and one or more attributes may be utilized.

In some embodiments, one or more attributes associated with the utterance may be utilized to store device data indicating device operations corresponding to a period of time (e.g., device data corresponding to a 30 second time period after the utterance was provided). In other embodiments, the one or more attributes may indicate a storage location from which device data may be retrieved. The device data may be maintained by the language processing engine 102 or another computing device and the language processing engine 102 or another computing device may be configured to maintain an association between the device data and the utterance provided by a user device. The device data occurring within some threshold time period from a time at which the utterance was provided at the user device.

Returning to FIG. 2, the language processing engine 102 may be configured to filter at least some of the machine-annotated language data from a potential training data set based at least in part on predetermined success criteria. In at least one embodiment, predetermined success criteria may be maintained. The success criteria may correspond to a particular feature, a particular device, a particular user, and the like. By way of example only, success criteria for a feature "play songs by artist" may indicate that, in order to be considered a successful utterance interpretation by the reference language model, device data should indicate that a song was played at the user device and that the user listened to the song for at least 30 seconds. Additional success criteria may indicate that a successful utterance interpretation can be determined when the user did not provide any additional device input for some period of time (e.g., 30 seconds) after providing the utterance. Utilizing the success criteria defined, the language processing engine 102 may identify that the interpretation of the utterance was successful/unsuccessful (e.g., that the utterance was recognized correctly and/or that the correct feature was executed in response to the utterance) and/or that the interpretation of the utterance was to some degree successful and/or unsuccessful. For example, a score may be provided (e.g., based at least in part on device data and one or more success criteria) that indicates a confidence (e.g., 90% confident) that the interpretation of the utterance was successful (e.g., that the utterance was recognized correctly and/or that the correct feature was executed in response to the utterance). The language processing engine 102 may be configured to discard machine-annotated language data of the reference language if the success score does not meet a threshold value and/or the utterance was indicated as being unsuccessful.

In some embodiments, the language processing engine 102 may include both the historical language data obtained at 202 and the unfiltered machine-annotated language data as a potential training data set for the target language model 114 of FIG. 1.

In some embodiments, the language processing engine 102 may utilize the potential training data set to identify a set of attribute values at 208. For example, the language processing engine 102 may be configured to identify carrier phrases from the training data set. In some embodiments, one utterance of the training data may include the phrase "I want to hear Artist X." Another utterance of the training data may include the phrase "I want to hear Band Y." The language processing engine 102 may be configured to identify the phrase "I want to hear" as a carrier phrase based at least in part on these two utterances. One example process for determining this carrier phrase may include the language processing engine 102 replacing each portion of an utterance corresponding to an artist (e.g., as indicated within the data object associated with each utterance) with a common value. For example, each of the utterances above may be used to generate the phrase "I want to hear xxx," by replacing the portion of the phrase that corresponds to an artist with the letters "xxx." The language processing engine 102 may then identify a number of times the utterance "I want to hear xxx" is utilized. In some embodiments, if the number of times the same phrase is utilized and/or whether that number exceeds a threshold value (e.g., 2 times, 10 times, 100 times, 1000 times, etc.). If the threshold number is exceeded, the language processing engine 102 may be configured to store "I want to hear" as an attribute value corresponding to a carrier phrase. The language processing engine 102 may subsequently utilized stored carrier phrases to generate additional training data as will be discussed further below.

At 210, the language processing engine 102 may be configured to machine translate the utterances, attribute identifiers, and/or attribute values of the training data set from one language to another. By way of example, utterances, attribute identifiers, and/or attribute values may be translated from a reference language (e.g., English) to a target language (e.g., German). The particular translation processing may utilize any suitable language translation techniques. In some embodiments, the language processing engine 102 may store any suitable data to indicate how the training data was translated. For example, the language processing engine 102 may store information indicating that a particular utterance "I want to hear" in English was translated to the German phrase "Ich möchte hören." Similarly, attribute names/labels and attribute value translations may be stored indicating such information was translated.

At 212, a process for filtering the translations may be performed. By way of example, the language processing engine 102 may sample a number of translated utterances to determine a degree of accuracy. In some embodiments, particular utterances for which a translation has been previously determined may be identified and the translated value may be verified as being accurate. The previously known translations may be pre-generated and utilized to verify accuracy of the translation. In some embodiments, a number of the translated training data may be provided to a human trained in both languages to verify accuracy of the translation. In still further examples, the translated training data may be provided to a crowd-source system to illicit feedback from any suitable number of humans indicating the accuracy of the translation. The language processing engine 102 may determine an accuracy score or any suitable accuracy determination for each instance of translated data (or at least for some number of instances of translated data) indicating the accuracy and/or a degree of accuracy of the translation. For example, an accuracy score may be based at least in part on any suitable combination of the analysis performed by the language processing engine 102 and/or input provided by one or more humans (e.g., human operators, crowd-source users, etc.) indicating the accuracy of the translation. If the accuracy score indicates that the accuracy of the translation is sufficient (e.g., was accurate, was accurate over a threshold value such as 90% accurate or higher, was deemed accurate by 80% of humans that analyzed its accuracy, etc.) the translation may remain in the training data set. Conversely, if the accuracy score indicate that the accuracy of the translation is insufficient (e.g., was not accurate, was inaccurate over a threshold value such as 20% inaccurate or higher, was deemed to be inaccurate by 25% of humans that analyzed the accuracy of the translation, etc.) the translation may be filtered from the training data set.

At 214, the language processing engine 102 may generate additional training data using catalog values. In some embodiments, the language processing engine 102 may access item information corresponding to one or more items. These items may be provided for consumption via an electronic marketplace. The language processing engine 102 may be operated by or on behalf of an electronic marketplace provider or the language processing engine 102 may operate separate from the electronic marketplace. Example items may include electronic content (e.g., music, videos, images, etc.) and/or physical items (e.g., clothes, toys, electronic devices, etc.). The item information obtained by the language processing engine 102 may indicate various item attributes of the items offered at the electronic marketplace. For example, the item information may include a list of artists for which at least one item offered at the electronic marketplace relates. The language processing engine 102 may retrieve a carrier phrase identified and stored as described at 208. The language processing engine 102 may also access the data indicating how that phrase was translated to German. The language processing engine 102 may utilize the retrieved carrier phase and its corresponding translation (e.g., "Ich möchte hören") to generate additional training data. For example, the translated carrier phase (e.g., "Ich möchte hören") may be appended to attributes determined from the item information. As a non-limiting example, the carrier phase may be appended with an artist identifier (e.g., an artist's name) for each artist indicated in the item information. Accordingly, the phases "Ich möchte hören Artist A (corresponding to "I want to hear Artist A"), "Ich möchte hören Artist B (corresponding to "I want to hear Artist B"), "Ich möchte hören Artist C" (corresponding to "I want to hear Artist C"), and the like may be generated. In some embodiments, a new phrase (utterance) may be generated for each artist identifier of the item information utilizing the carrier phase "Ich möchte hören." These new utterances may be included in the training data set.

At 214, the language processing engine 102 (or a component of an annotation provider separate from the language processing engine 102) may be utilized to generate machine annotations for at least some portion of the training data set. The process performed may be similar to the machine annotation generation process described above in which attribute categories and/or values are determined for an utterance.

At 216, a process for annotating the training data set may be provided. In some examples, attributes of the historical language data and/or the machine annotated language data may be translated from the reference language to the target language in this step. In some embodiments, an annotation model trained to provide target language annotations may be utilized to identify attributes and/or features associated with each translated utterance. This annotation model may be the same annotation model and/or same technique as described above at 204. An annotation model trained to provide target language annotations may be trained from reference annotation data of a reference language in a similar manner as described herein.

At 218, a process for verifying and/or augmenting the machine generated annotations may be performed. By way of example, the language processing engine 102 may sample a number of machine annotations (e.g., German annotations of the training data) to determine a degree of accuracy. In some embodiments, previously determined annotations for a predetermined set of German utterances may be utilized to verify accuracy of newly generated machine annotations. In some embodiments, a number of the machine-generated annotations may be provided to a human trained in both languages to verify accuracy of the annotation. In some embodiments, the human may be configured to add additional annotations and/or modify existing annotations to augment the machine-generated annotations. In some embodiments, the additional and/or modified human-provided annotations may replace the machine-generated annotations, while in other embodiments, the human-provided annotations may be stored with the machine-generated annotations (e.g., in separate fields of a common data object). The language processing engine 102 may determine an accuracy score or any suitable accuracy determination for each instance of machine-generated annotated data (or at least for some number of instances of annotated data) indicating the accuracy and/or a degree of accuracy of the annotation. For example, an accuracy score may be based at least in part on any suitable combination of the analysis performed by the language processing engine 102 and/or input provided by one or more humans indicating the accuracy of the machine-generated annotation. If the accuracy score indicates that the machine-generated annotation of the translation is sufficient (e.g., was accurate, was accurate over a threshold value such as 90% accurate or higher, was deemed accurate by 80% of humans that analyzed its accuracy, etc.) the translation may remain in the training data set. Conversely, if the accuracy score indicate that the accuracy of the machine-generated annotation is insufficient (e.g., was not accurate, was inaccurate over a threshold value such as 20% inaccurate or higher, was deemed to be inaccurate by 25% of humans that analyzed the accuracy of the translation, etc.) the machine-translated annotation and/or the language data containing the machine-translated annotation may be filtered from the training data set. Any threshold values utilized to filter machine-translated annotations may be the same or different from threshold values utilized to filter machine-generated translations from the training data set.

At 220, a target language model may be trained by the language processing engine 102 utilizing the resultant training data set determined by executing the operations described above from 202-218. As described above, the target language model may be trained, utilizing any suitable natural language processing techniques, to ascertain the identify an utterance from a voice sample containing one or more spoken words and/or to identify a feature related to the identified utterance. The target language model may utilize techniques including part-of-speech tagging, parsing, word segmentation, semantical intent analysis, sentiment analysis, topic segmentation, or the like. In some embodiments, the target language model may include the functionality for providing machine-generated annotations in the target language (e.g., German).

Once generated, the target language model may be deployed at 222. In some embodiments, deployment may include providing and/or making available the target language model to one or more user devices. By way of example, the language processing engine 102 may store the target language model trained at 220 at a particular storage location accessible to one or more user devices and/or the language processing engine 102 may transmit the target language model to the one or more user devices. In still further embodiments, the language processing engine 102 may begin utilizing the target language model trained at 220 to provide subsequent translation, annotation, and/or interpretation functionality (e.g., identifying an input utterance and identifying and/or causing a related feature to be executed at a user device).

At 224, the language processing engine 102 may be configured to collect and/or monitor device data to determine whether utterances provided to the new target language model were correctly interpreted and/or whether or not the correct feature was seemingly executed in response to receiving the utterances. As a non-limiting example, the language processing engine 102 may utilize predetermined success criteria for evaluating the utterance and executed feature with respect to device data collected at the user device. By way of example, the success criteria may correspond to a particular feature, a particular device, a particular user, or the like. As a non-limiting example, success criteria for a feature "play songs by artist" may indicate that, in order to be considered a successful utterance interpretation by the reference language model, device data should indicate that a song was played at the user device and that the user listened to the song for at least 30 seconds. Additional success criteria may indicate that a successful utterance interpretation can be determined when the user did not provide any additional device input for some period of time (e.g., 30 seconds) after providing the utterance. Utilizing the success criteria defined, the language processing engine 102 may identify that the interpretation of the utterance was successful/unsuccessful (e.g., that the utterance was recognized correctly and/or that the correct feature was executed in response to the utterance) and/or that the interpretation of the utterance was to some degree successful and/or unsuccessful. For example, a score may be provided (e.g., based at least in part on device data and one or more success criteria) that indicates a confidence (e.g., 90% confident) that the interpretation of the utterance was successful (e.g., that the utterance was recognized correctly and/or that the correct feature was executed in response to the utterance). The language processing engine 102 may be configured to remove historical language data provided to the currently utilized target language model from a subsequent training data set utilized to retrain the target language model over time.

At 226, the language processing engine 102 may illicit feedback from one or more users. In some embodiments, the language processing engine 102 may cause one or more operations to be performed at the user device to illicit such feedback. For example, a user may provide the utterance "play the U2 I heard yesterday" at a user device and the utterance may be received by the language processing engine 102. If the utterance is not recognizable (e.g., a data object corresponding to the utterance is not found), the language processing engine 102 may be configured to determine a question to pose to the user. For example, the language processing engine 102 may cause the device to provide (e.g., textually, audibly, etc., via any suitable method) a question such as "I don't know how to do that. May I ask you a question to understand this request better?" In some embodiments, the user may respond and the user input corresponding to the response may be received by the language processing engine 102. If the user input indicates that the user has acquiesced to being asked an addition question(s), the language processing engine 102 may proceed with posing an additional question. Otherwise, the language processing engine 102 may cease feedback processing (perhaps after causing the device to provide the statement akin to "Sorry about that").

The language processing engine 102 may utilize a predetermined scheme to pose one or more questions to receive one or more instances of user input. The one or more questions may be determined from a database and/or mapping. The particular questions may be associated with any suitable combination of a word or phrase of the utterance, one or more attributes associated with the utterance, one or more features, one or more users (e.g., including the particular user providing input), or any suitable combination of the above. In some embodiments, the questions may be related such that a response to one question can be utilized to determine a following question to be posed. In some embodiments, the language processing engine 102 may utilize the feedback provided in the user's response(s) to update the target language model data. By way of example, if the user's response indicated that the utterance was correctly identified (e.g., the correct utterance was recognized) but the wrong feature was executed (e.g., indicating that the feature currently associated with the utterance is incorrect), the language processing engine 102 may be configured to store the user's response(s) as user-provided data with the instance of target language data or at a suitable location. In some embodiments, given the determination that the utterance was correctly identified but the wrong feature was executed, the language processing engine 102 may be configured to remove a corresponding instance of language data from storage and/or restrict the instance of language data from being included in a subsequent training data set utilized to retrain and/or update the target language model.

The operations of 202-224 may be performed any suitable number of times in any suitable order in order to retrain the target language model over time utilizing new reference language data (e.g., English data) and/or new target language data (e.g., German data) such that the accuracy of the target language model may be improved over time.

Figure 3:
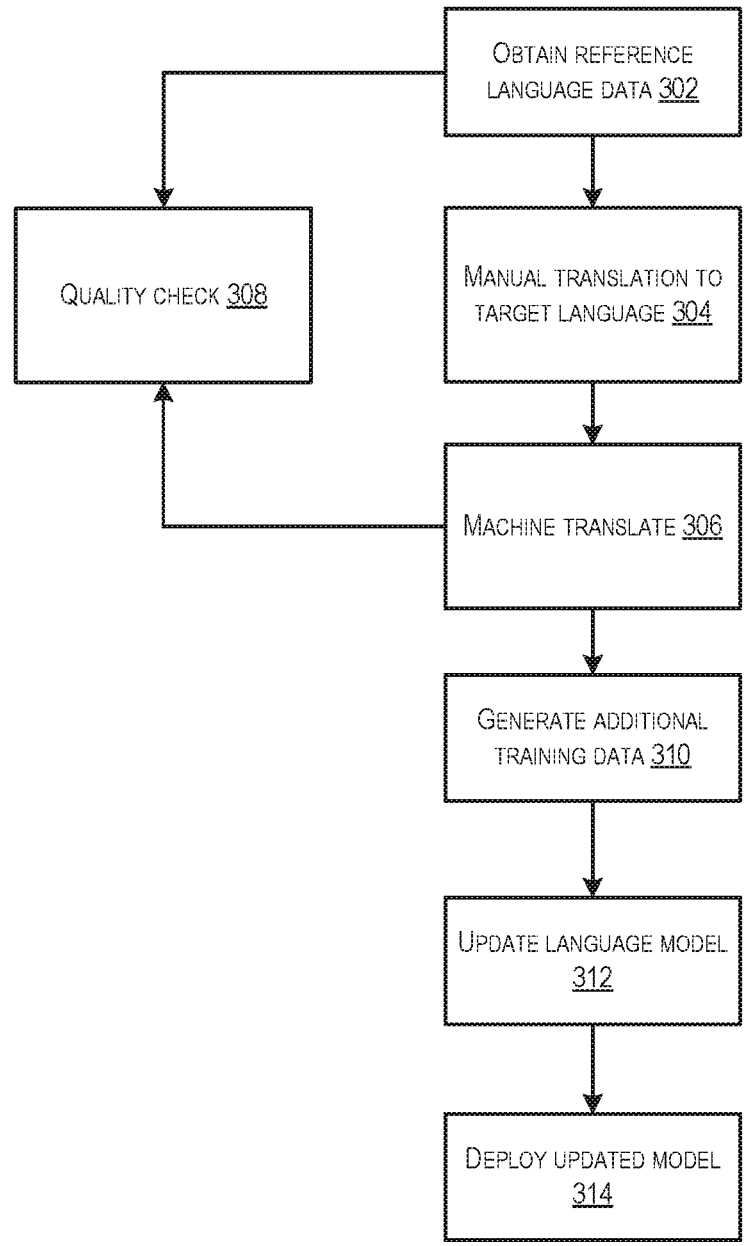
FIG. 3 is a block diagram illustrating another example method for training a target language model utilizing the language processing engine of FIG. 1, in accordance with at least one embodiment.

FIG. 3 is a block diagram illustrating another example method 300 for training a language model utilizing the language processing engine of FIG. 1, in accordance with at least one embodiment. In the example provided in FIG. 3, a model trained in a reference language (e.g., English) may be updated to recognize and interpret target language utterances (e.g., utterance provided in German) that have been translated to the reference language.

By way of example, at 302, reference language data may be obtained. By way of example, the reference language data may include historical utterances and corresponding human-generated and/or machine-generated annotations associated with each utterance. In some embodiments, the reference language data may include machine-generated language data such as additional training data generated via the process of identifying carrier phases and inserting item attribute values described above in connection with FIG. 2.

At 304, a manual translation of the reference language data may be performed. In some embodiments, the reference language data may be provided (e.g., by the language processing engine 102) at a user interface to illicit a human provided translation.

Additionally, or alternatively, the reference language data may be machine translated by the language processing engine 102 at 306. This translation may utilize any suitable process for translating, by a machine data, from a first language to data of a second language. In some embodiments, the human provided translation and/or the machine-generated translation may be stored (e.g., as an association with the reference language, within an object/container containing the reference language data, etc.).

At 308, any suitable type and/or number of quality checks may be performed. By way of example, the human translation and the machine-generated translation may be compared to identify a degree of similarity. If the degree of similarity exceeds a threshold value, the machine translation may be deemed accurate. In some embodiments, manual translations may not be provided but machine translations may be checked for quality at 308. In this example, the machine translations may be compared to previously provided translations to determine an accuracy of the current translation. In some embodiments, a number of translations (e.g., all, some subset, etc.) may be provided to human verifiers that can indicate a degree of accuracy of the translation. An accuracy score (otherwise referred to as a quality score) may be generated by the language processing engine 102 to indicate a degree of accuracy/quality of the translation based at least in part on one or more quality checks performed at 308. The translated version of the reference language data may be included in or excluded from a potential training data set depending on the accuracy and/or quality of the translation as determined at 308.

At 310, additional training data phrases may be generated in a similar manner as described above in connection with FIG. 2. For example, the language processing engine 102 may be configured to identify carrier phases of the training data set. In this case, the training data set may include reference language data and/or target language data. In a similar manner as previously described, the language processing engine 102 may identify carrier phases of the reference and/or target utterances. The carrier phrases may be utilized, in conjunction with item attributes assessable to the language processing engine 102, to generate any suitable number of potentially new reference/target language data. In some embodiments, any duplicate reference/target language data may be removed from the training data set (e.g., two object having the exact same utterance) or the duplicate data may be merged into a single data container associated with a common utterance.

At 312, the reference language data, the translated language data, and/or the additional training data may be utilized to update the language model. Accordingly, a language model which may have previously been trained to recognize and perform operations in a first language (e.g., English) may be updated to recognize and perform operations according to the first language as well as a machine-translated version of a second language (e.g., an English translation translated by a machine from an utterance provided in German).

At 314, the updated language model may be deployed. In some embodiments, deployment may include providing and/or making available the updated language model to one or more user devices. By way of example, the language processing engine 102 may store the updated language model at a particular storage location accessible to one or more user devices and/or the language processing engine 102 may transmit the updated language model to the one or more user devices. In still further embodiments, the language processing engine 102 may begin utilizing the updated language model to provide subsequent analysis, translation, annotation, and/or interpretation functionality (e.g., identifying an input utterance, provided in English or an English translation of a German utterance, and identifying and/or causing a related feature to be executed at a user device).

Figure 4:
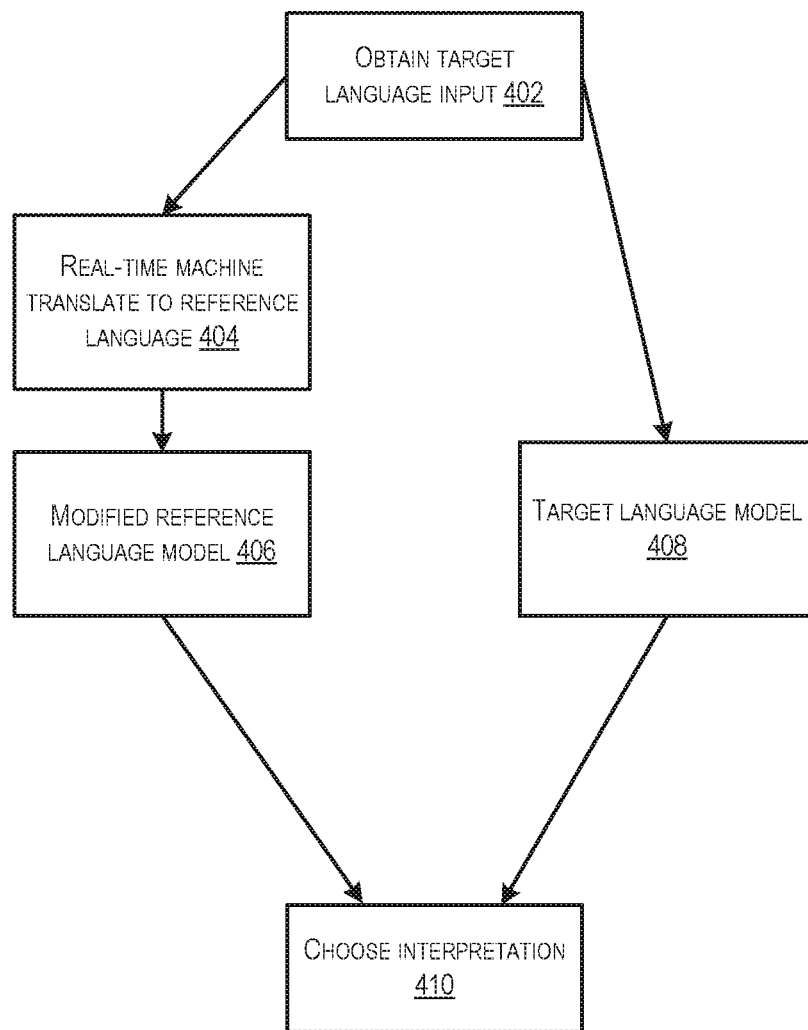
FIG. 4 is a block diagram illustrating an example method for choosing an interpretations from the output of two language recognition models, in accordance with at least one embodiment.

FIG. 4 is a block diagram illustrating an example method 400 for selecting interpretations from the output of two language recognition models, in accordance with at least one embodiment. The target language model discussed within the description of FIG. 4 may be an example of the language model trained via method 200 described above in connection with FIG. 2. The modified reference language model discussed within the description of FIG. 4 may be an example of the language model trained via the method 300 described above in connection with FIG. 3. For the purposes of illustrating, the target language may be German and the reference language may be English.

At 402, target language input (e.g., an utterance provided in German) may be obtained. By way of example, a user may utilize a user device to provide vocal input via a microphone of the user device. The vocal input may be received by the language processing engine 102. In some embodiments, the vocal input may be utilized in two ways.

For example, at 404, the language processing engine 102 may be configured to execute real-time machine translation of the utterance from the target language (e.g., German) to the reference language (e.g., English). The translation may be performed utilizing any suitable translation techniques.

At 406, the translated utterance may be provided to the modified reference language model for analysis. The modified reference language model may previously trained (e.g., via the method 300) to recognize the utterance and determine a feature to be executed at the user device, the feature being associated with the utterance. The modified reference language model may output any suitable more of language data associated with utterance. By way of example, the output may include the identified utterance, any suitable feature associated with the identified utterance, for example, a feature associated with the identified utterance.

Similarly, after obtaining the target language input at 402, the language processing engine 102 may submit the target language input to a target language model at 408. The target language model may have been previously trained via the method 200 to recognize the utterance and determine a feature to be executed at the user device, the feature being associated with the utterance. The target language model may output any suitable more of language data associated with utterance. By way of example, the output may include the identified utterance, any suitable feature associated with the identified utterance, for example, a feature associated with the identified utterance. It should be appreciated that the target language input may be provided to the modified reference language model and the target language model in any suitable order.

First output corresponding to the output provided by the modified reference language model and second output corresponding to the output provided by the target language model may be received by the language processing engine 102 at 410. In some embodiments, the language processing engine 102 may be configured to select an interpretation (e.g., an output) of the two outputs. In some embodiments, the language processing engine 102 may utilize a predetermined selection scheme to determine which output to select. In some embodiments, the language processing engine 102 may identify success criteria for each interpretation and evaluate the success scores of each output. In some embodiments, the outputs may individually include the success scores associated with the respective utterances. Accordingly, the language processing engine 102 may be configured to select a particular interpretation corresponding to one of the two outputs based at least in part on the success score (e.g., perhaps the higher success score of the two).

Once an interpretation is selected (e.g., language data corresponding to a particular output is selected), the language processing engine 102 (e.g., operating at the user device or at a server computer) may cause the user device to perform the operations associated with the feature associated with the interpretation (e.g., the feature associated with the language data corresponding to the particular output selected).

Figure 5:
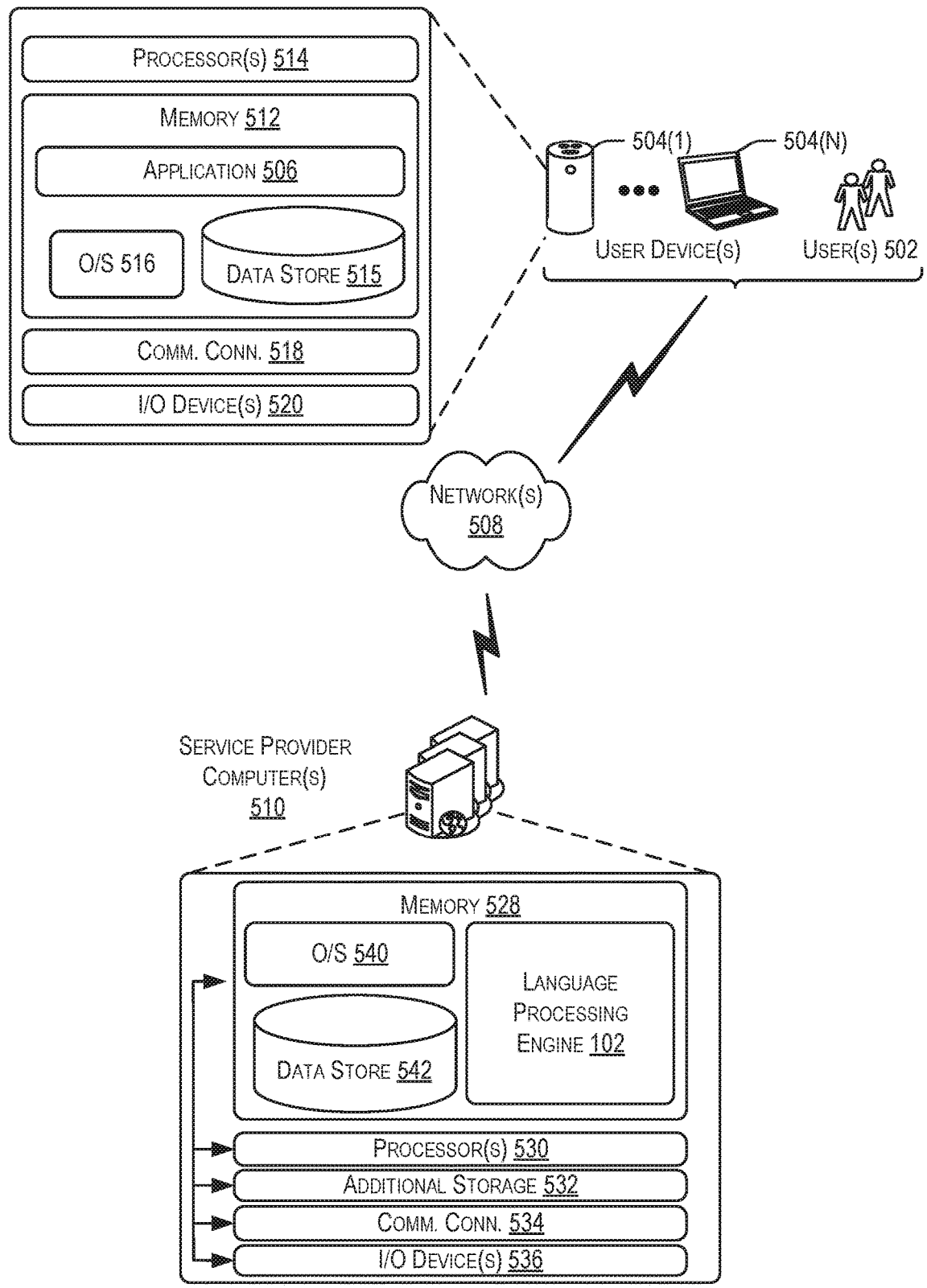
FIG. 5 illustrates components of a language processing system according to a particular embodiment.

FIG. 5 illustrates components of a language processing system 500 according to a particular embodiment. In system 500, one or more user(s) 502 may utilize a user device (e.g., a user device of a collection of user device(s) 504 to provide vocal input (or any suitable input) corresponding to features of, and/or operations to be executed by, the user device(s) 504. For example, the user may speak a phrase containing one or more spoken words provided via a microphone of the user device(s) 504 (or accessible to the user device(s) 504). In some embodiments, the vocal input through an application 506 running on the user device(s) 504 via one or more network(s) 508 (e.g., the network(s) 112 of FIG. 1). In some aspects, the application 506 operating on the user device(s) 504 may be hosted, managed, and/or provided by a computing resources service or service provider, such as by utilizing one or more service provider computer(s) 510.

In some examples, the network(s) 508 may include any one or a combination of many different types of networks, such as cable networks, the Internet, wireless networks, cellular networks, and other private and/or public networks. While the illustrated example represents the user(s) 502 accessing application functionality over the network(s) 508, the described techniques may equally apply in instances where the user(s) 502 interact with the service provider computer(s) 510 via the one or more user device(s) 504 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 506 may allow the user(s) 502 to interact with the service provider computer(s) 510 so as to provide the various functionality described above. For example, a user may utilize the application 506 to submit vocal input. In at least one example, the application 506 may be configured to provide the input to the language processing engine 102. The application 506 may further be configured to receive instructions (e.g., from the service provider computer(s) 510 or another system) corresponding to the vocal input. The instructions may indicate one or more operations to be performed at the user device(s) 504. In some embodiments, the application 506 may be configured to render and/or present (e.g., via a display and/or a speaker) electronic content provided by the service provider computer(s) 510 in response the vocal input. Although depicted as operating at the service provider computer(s) 510, it should be appreciated that at suitable portion of the language processing engine 102 may operate additionally and/or alternatively at the user device(s) 504. It should be appreciated that the functionality described in connection with application 506, in whole or in part, may alternatively be provided by operating system (O/S) 516 of the user device(s) 504.

The service provider computer(s) 510, perhaps arranged in a cluster of servers or as a server farm, may host the application 506 operating on the user device(s) 504 and/or cloud-based software services. Other server architectures may also be used to host the application 506 and/or cloud-based software services. The application 506 operating on the user device(s) 504 may be capable of handling requests from the user(s) 502 and serving, in response, various user interfaces that can be rendered at the user device(s) 504. The application 506 operating on the user device(s) 504 can present any suitable type of website that supports user interaction, including search engine sites, item detail pages, and the like. The described techniques can similarly be implemented outside of the application 506, such as with other applications running on the user device(s) 504. In some embodiments, the vocal input may be received from a first user device of the user device(s) 504, interpreted by the language processing engine 102, and operations corresponding to the vocal input may be performed by the first user device and/or a second user device of the user device(s) 504.

The user device(s) 504 may be any suitable type of computing device such as, but not limited to, a mobile phone, a Bluetooth-enabled device, a touch screen device, a smartphone, voice-controlled intelligent personal assistant device (e.g., an Amazon Echo®, an Echo Dot®, etc.), a laptop computer, a media player, a desktop computer, a thin-client device, a tablet PC, an electronic book (e-book) reader, etc. In some examples, the user device(s) 504 may be in communication with the service provider computer(s) 510 via the network(s) 508, or via other network connections.

In one illustrative configuration, the user device(s) 504 may include at least one memory 512 and one or more processing units (or processor(s)) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described.

The memory 512 may store program instructions that are loadable and executable on the processor(s) 514, as well as data generated during the execution of these programs. Depending on the configuration and type of user computing device, the memory 512 may be volatile (such as random access memory (RAM)) and/or non-volatile (such as read-only memory (ROM), flash memory, etc.). The user device(s) 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the contents of the memory 512 in more detail, the memory 512 may include an operating system 516, one or more data stores (e.g., data store 515), and one or more application programs, modules, or services for implementing the features of the language processing engine 102 disclosed herein. The application 506 may be configured to receive, store, and/or display information for interacting with the service provider computer(s) 510. Additionally, the memory 512 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 504 may also contain communications connection(s) 518 that allow the user device(s) 504 to communicate with a stored database, another computing device or server (e.g., the service provider computer(s) 510), user terminals and/or other devices on the network(s) 508. The user device(s) 504 may also include I/O device(s) 520, such as a keyboard, a mouse, a pen, a voice input device such as a microphone, a touch input device, a display, speakers, a printer, etc.

In some aspects, the service provider computer(s) 510 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 510 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 510 may be in communication with the user device(s) 504 and/or other service providers via the network(s) 508 or via other network connections. The service provider computer(s) 510 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 510 may include at least one memory 528 and one or more processing units (or processor(s)) 530. The processor(s) 530 may be implemented as appropriate in hardware, computer-executable instructions, firmware, or combinations thereof. Computer-executable instruction or firmware implementations of the processor(s) 530 may include computer-executable or machine-executable instructions written in any suitable programming language to perform the various functions described.

The memory 528 may store program instructions that are loadable and executable on the processor(s) 530, as well as data generated during the execution of these programs. Depending on the configuration and type of service provider computer(s) 510, the memory 528 may be volatile (such as RAM) and/or non-volatile (such as ROM, flash memory, etc.). The service provider computer(s) 510 or servers may also include additional storage 532, which may include removable storage and/or non-removable storage. The additional storage 532 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 528 may include multiple different types of memory, such as SRAM, DRAM, or ROM.

The memory 528, the additional storage 532, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 528 and the additional storage 532 are all examples of computer storage media. Additional types of computer storage media that may be present in the service provider computer(s) 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 510 may also contain communications connection(s) 534 that allow the service provider computer(s) 510 to communicate with a stored database, another computing device or server, user terminals and/or other devices on the network(s) 508. The service provider computer(s) 510 may also include I/O device(s)

536, such as a keyboard, a mouse, a pen, a voice input device, a touch input device, a display, speakers, a printer, etc.

Turning to the contents of the memory 528 in more detail, the memory 528 may include an operating system 540, one or more data stores 542, and/or one or more application programs, modules, or services for implementing the features disclosed herein, such as the functionality provided by the language engine 102 as described herein.

Figure 6:
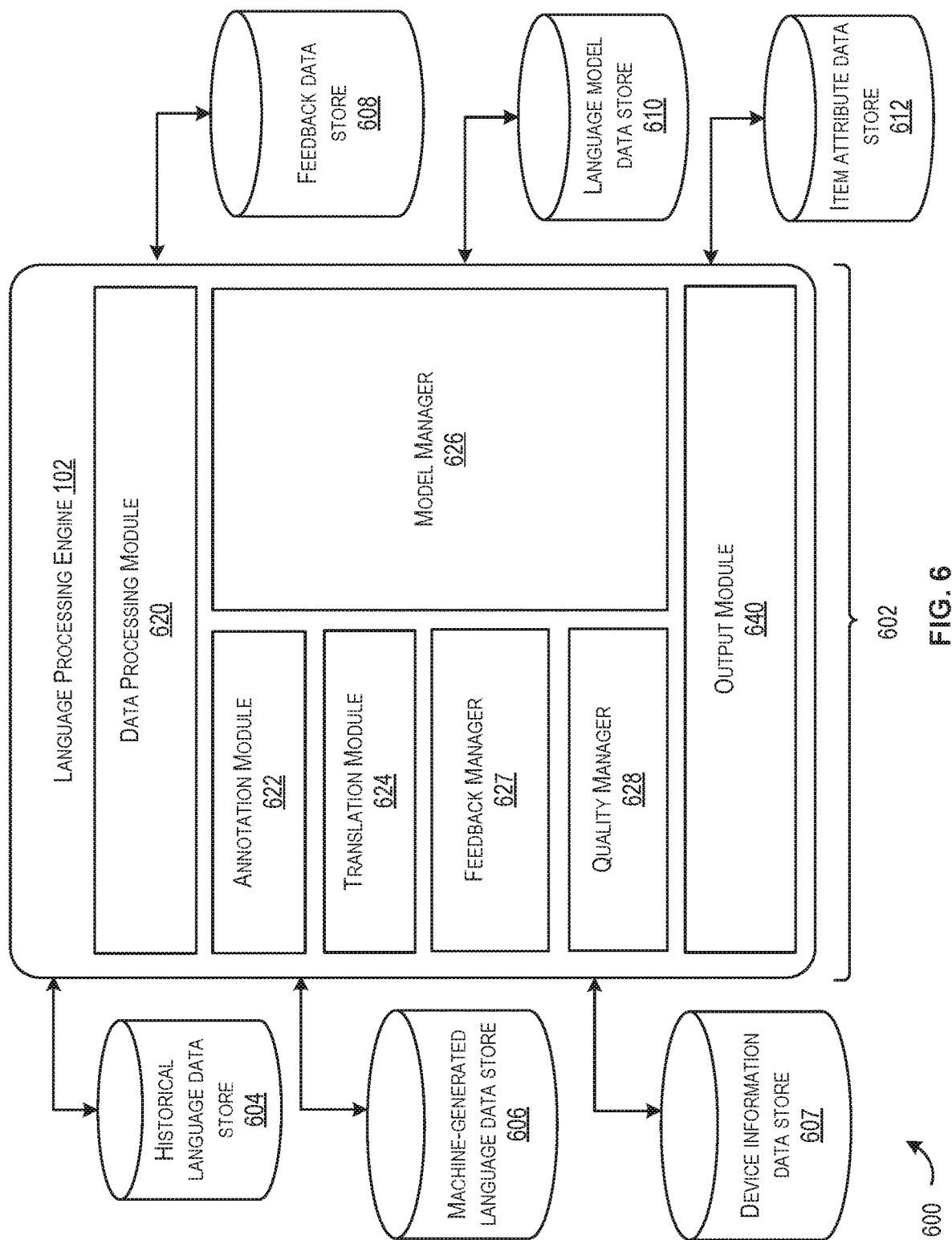
FIG. 6 is a schematic diagram of an example computer architecture for the language processing engine, including a plurality of modules that may perform functions in accordance with at least one embodiment.

FIG. 6 is a schematic diagram of an example computer architecture 600 for the language processing engine 102, including a plurality of modules that may perform functions in accordance with at least one embodiment. The modules 602 may be software modules, hardware modules, or a combination thereof. If the modules 602 are software modules, the modules 602 can be embodied on a computer readable medium and processed by a processor in any of the computer systems described herein. It should be noted that any module or data stores described herein, may be, in some embodiments, be a service responsible for managing data of the type required to make corresponding calculations. The modules 602 may be exist as part of the language processing engine 102 operating on the service provider computer(s) 510 of FIG. 5, or the modules may exist as separate modules or services external to the service provider computer(s) 510 (e.g., as part of the application 506 of FIG. 5 operating on the user device(s) 504 of FIG. 5).

In the embodiment shown in the FIG. 6, a historical language data store 604, a machine-generated language data store 606, a device information data store 607, a feedback data store 608, a language model data store 610, and an item attribute data store 612 are shown, although data can be maintained, derived, or otherwise accessed from various data stores, either remote or local to the language processing engine 102, to achieve the functions described herein. In at least one embodiment, the data stores described herein may be physically located on the user device(s) 504 or alternatively, any suitable combination of the data stores may be operated as part of the service provider computer(s) 510. In some embodiments, the data stores of FIG. 6 may be separate from but accessible to the user device(s) 504 and/or the service provider computer(s) 510. The language processing engine 102, as shown in FIG. 6, includes various modules such as a data processing module 620, an annotation module 622, a translation module 624, a model manager 626, a feedback manager 627, a quality manager 628, and an output module 640. Some functions of the modules 620, 622, 624, 626, 628, and 640 are described below. However, for the benefit of the reader, a brief, non-limiting description of each of the modules is provided in the following paragraphs. In accordance with at least one embodiment, one or more processes are enabled for training one or more language models as described herein.

In at least one embodiment, the language processing engine 102 includes the data processing module 620. Generally, the data processing module 620 may be utilized to receive any suitable information with respect to any example provided herein. The data processing module 620 may include any suitable number of application programming interfaces with which the functionality of the language processing engine 102 may be invoked.

In some embodiments, the data processing module 620 may be configured to receive and/or obtain historical language data of any suitable language. The historical language data may be stored by the data processing module 620 in the historical language data store 604, a data store configured to store such information. The historical language data of one or more languages may be stored within the historical language data store in a common container and/or database or in separate containers and/or databases specific to a language. By way of example, the historical language data store 604 may store language data corresponding to English language data, German language data, Japanese language data, etc. The historical language data store 604 may additionally include language data that, at least in part, may have been initially provided in one language (e.g., German) but translated to another language (e.g., English). In some embodiments, each type of historical language data (e.g., English, German, German translated to English, etc.) may be stored in multiple data stores (not depicted).

In some embodiments, the data processing module 620 may be configured to receive and/or obtain machine-generated language data corresponding to any suitable portion of language data that has been generated by a machine. That is, machine-generated utterances, attribute names/labels, attribute values, and/or feature identifiers, generated by a machine may be stored in the machine-generated language data store 606. It should be appreciated that in some embodiments, the machine-generated language data and the historical language data may be stored in a common data store and/or in common data containers (e.g., data objects).

In some embodiments, the data processing module 620 may be configured to receive and/or obtain device information (otherwise referred to as device data) that indicates actions and/or input submitted by a user at a user device, and/or any suitable operations performed the user device. As discussed above, this device information may be collected by the user device and provided to the language processing engine 102 at any suitable time. In some embodiments, the device information may relate to a time period (e.g., 30 seconds, 1 minute, 1 day, 1 month, etc.) immediately after a vocal input is received at the user device. The data processing module 620 may be configured to store the device information at the device information data store 607. In some embodiments, device information may be stored in a common data store along with the historical language data and/or the machine-generated language data and/or the device information, historical language data, and/or the machine-generated language data may be stored in a common data object. By way of example, a data object associated with a particular utterance may include any suitable combination of historical language data, machine-generate language data, and/or device information that relates to the same utterance. In some embodiments, the device information may relate to a particular user and/or the device information may relate to any suitable number of users.

In some embodiments, the data processing module 620 may be configured to receive and/or obtain feedback information. Feedback information may include any responses provided in response to information provided by the language processing engine 102 and provided at the user device. For example, the questions posed to the user by the language processing engine 102 via the user device may illicit user feedback. This user feedback may be received and/or obtained by the language processing engine 102 and stored at the feedback data store 608.

In some embodiments, the data processing module 620 may be configured to receive and/or obtain item attribute information. As discussed above, item attribute information may relate to one or more items offered for consumption at an electronic marketplace. The item attribute information may be in any suitable format such that particular attributes (e.g., artists, toy names, electronic identifiers, etc.) associated with one or more items may be ascertainable.

According to some embodiments, the annotation module 622 may be configured to perform operations for annotating any suitable number of utterances. These utterances, as discussed above in connection with FIGS. 2 and 3, may be provided by a human (e.g., manually typed as part of a training process, provided at a user device as vocal input, etc.) or the utterances may be machine-generated. In at least one embodiments, the annotation module 622 may maintain an annotation model. The annotation model may be stored in language model data store 610 or at another suitable storage location. As discussed above, the annotation model may be a stand-alone language recognition model, or the functionality of the annotation model may be provided as part of any of the models described in connection with FIGS. 2-4 (e.g., a reference language model, a target language model, a modified reference language model, etc.). The annotation model may be configured by the annotation module 622 to utilize any suitable natural language processing techniques to identify that one or more portions of an utterance relate to one or more attribute categories and/or values. The annotation module 622 may train the annotation module utilizing any suitable supervised and/or unsupervised learning techniques utilizing historical data for which annotations (e.g., utterance/attribute associations) are known. Once trained, the annotation model may then be provided new utterances for which it may determine any suitable number of attributes (e.g., categories and/or values) corresponding to the provided utterance.

As a non-limiting example, an utterance including the words "Call Mom" may be provided to the annotation model. The annotation model may be trained to identify that the word "call" may correspond to a feature such as "make a telephone call," and that "Mom" corresponds to a person (e.g., corresponding to contact information stored at the user device). In some embodiments, the feature may correspond to a set of device instructions and/or operations to be performed by the user device. The annotation module 622 may be configured to receive the identified attributes as output from the annotation model and may update a data object associated with the utterance (e.g., stored in the machine-generated language data store 606) to include those attributes. By way of example, the annotation module 622 may update a data object for the utterance "Call Mom" to include an attribute that identifies an association with the feature "make a telephone call" and an attribute that indicates a subject "Mom." Any suitable number and type of attributes may be identifiable by the annotation model. These attributes may indicate characteristics of the utterance and/or a portion of the utterance and/or the attributes may indicate associations between the utterance and/or a portion of the utterance and additional data. It should be appreciated that any suitable techniques for determining associations between the utterance and/or a portion of the utterance and one or more attributes may be utilized, in addition, or in lieu of utilization of the annotation model.

According to some embodiments, the translation module 624 may be configured to perform operations for translating language data of a first language to corresponding language data of a second language. The translation module 624 may utilize any suitable translation techniques such as a third-party translation provider, a translation model trained to take a phrase in one language and output its corresponding phrase in a second language, or the like. The translated data (e.g., a translated utterance, a translated attribute name and/or value, a translated feature identifier, etc. may be stored as machine-generated language data as described above. In some embodiments, the translation module 624 may maintain a mapping between an utterance (or any suitable language data) initially provided in a first language and the corresponding translated version of a second language. This mapping may be stored in any suitable location such as the machine-generated language data store 606 separately, or as part of a data object associated with the utterance. As a simplistic example, the data object corresponding to an English utterance may be updated to include the utterance as machine-translated to German.

In some embodiments, the model manager 626 may perform any suitable operations related to training and updating any of the language models described herein. For example, the model manager 626 may perform the operations related to training and/or updating language models as described in FIGS. 2-4. The model manager 626 may be configured to collect historical language data and or machine-generated language data for a potential training data set. In some embodiments, the model manager may stimulate any operation of the annotation module 622, the translation module 624, the feedback manager 627, and/or the quality manager 628 in accordance with the methods described above in connection with FIGS. 2-4. The model manager 626 may be further configured to receive, via the data processing module 620, vocal input (e.g., an utterance) initially obtained at a user device. Upon receipt, or another suitable time, the model manager 626 may provide the vocal input (e.g., the utterance) to a currently utilized language model to recognize the utterance and identify a feature corresponding to the utterance. The model manager 626 may provide at least some portion of the output provided by the language model (e.g., the feature identifier) to the output module 640.

In some embodiments, the model manager 626 may be configured to train multiple language models as described above in connection with FIG. 4. The model manager 626, utilizing a predetermined protocol set may select a particular output from a particular language model over output provided by another language model.

The quality manager 628 may be configured to analyze the quality of one or more machine-provided annotations and/or translations. Any suitable quality check regarding determining the accuracy and/or quality of an annotation and/or a translation described above, may be performed by the quality manager 628. In some embodiments, the quality manager 628 may obtain machine-generated language data from the machine-generated language data store 606. The quality manager 628 may compare the machine-generated language data to predetermined language data for which annotations and/or translations are known. The quality manager 628 may produce a quality score quantifying a degree of similarity between the predetermined language data. If the quality score is under a threshold value, the quality manager 628 may be configured to delete and/or discard the machine-generated language data, or otherwise inhibit the machine-generated language data having poor quality from being included in a training data set for a model to be trained. In some embodiments, the quality manager 628 may be configured to provide (e.g., via the output module 640) one or more machine-generated annotations and/or one or more machine-generated translations to one or more humans (e.g., humans that provide training data, users of a crowd-sourcing system, etc.) to illicit feedback regarding the quality of an annotation and/or translation. The user feedback regarding the quality of the annotation and/or translation may be stored in feedback data store 608 and/or such feedback may be stored with the machine-generated language data.

The quality manager 628 may be configured to analyze the quality of particular language data (e.g., associations between various attributes of an instance of language data). For example, the quality manager 628 may be configured to maintain success criteria related to a user, a feature, a device, or the like. In some embodiments, the quality manager 628 may perform any operations discussed herein related to identifying success criteria with which to evaluate the accuracy of recognizing the utterance and the successfulness of executing the correct feature in response to recognizing the utterance from user input. Utilizing the identified success criteria and any suitable device information related to the utterance, the quality manager 628 may be configured to calculate a success score as discussed above in connection with FIGS. 2 and 3. The quality manager 628 may be configured to delete and/or discard any language data for which a success score is calculated that does not meet a quality threshold (e.g., falls below or exceeds a threshold value). In some embodiments, the quality manager 628 may inhibit the language data from being utilized to train/update any suitable language model(s).

The feedback manager 627 may be configured to perform any suitable operations for providing questions to illicit feedback in the form of user responses. The feedback manager 627 may maintain any suitable number of questions (e.g., within the feedback data store 608) that may be related to each other in any suitable manner. By way of example, the feedback manager 627 may maintain a predetermined protocol set for determining a particular series of questions to pose to a user at particular times and/or according to particular stimuli. As a simplistic example, the quality manager 628, upon determining a success score indicating poor quality related to some portion of language data, may invoke the functionality of the feedback manager 627 to query the user as to the potential cause of the poor quality language data. As another example, the model manager 626, upon determining that the input utterance is not known (as determined by the language model currently in use) or at another suitable time, may invoke the functionality of the feedback manager 627 to illicit feedback from the user. Response information received from the user may be stored at the feedback data store 608 for later processing. In some embodiments, the response information may cause the feedback manager 627 to store the feedback with the language data to which it pertains. In still further embodiments, the feedback manager 627 may replace and/or augment language data according to the feedback received.

According to some embodiments, the output module 640 may be configured to provide any suitable data utilized by the modules 602 to a user device and/or a separate system (e.g., a crowd-sourcing system). In some embodiments, the output module 640 may be configured to provide any suitable interface for obtaining user input. By way of example, the output module 640 may provide any suitable interface, rendered at a user device, to enable to user to enter any suitable language data (e.g., utterances, attribute names/labels, attribute values, etc.), to enter translations, to correct machine-generated translations or to indicate errors in machine-generated language data and/or machine-generated translations. The output module 640 may be further configured to identify a set of instructions or instructive data corresponding to a feature, that, when received by a user device, causes the user device to perform one or more operations corresponding to the feature.

Figure 7:
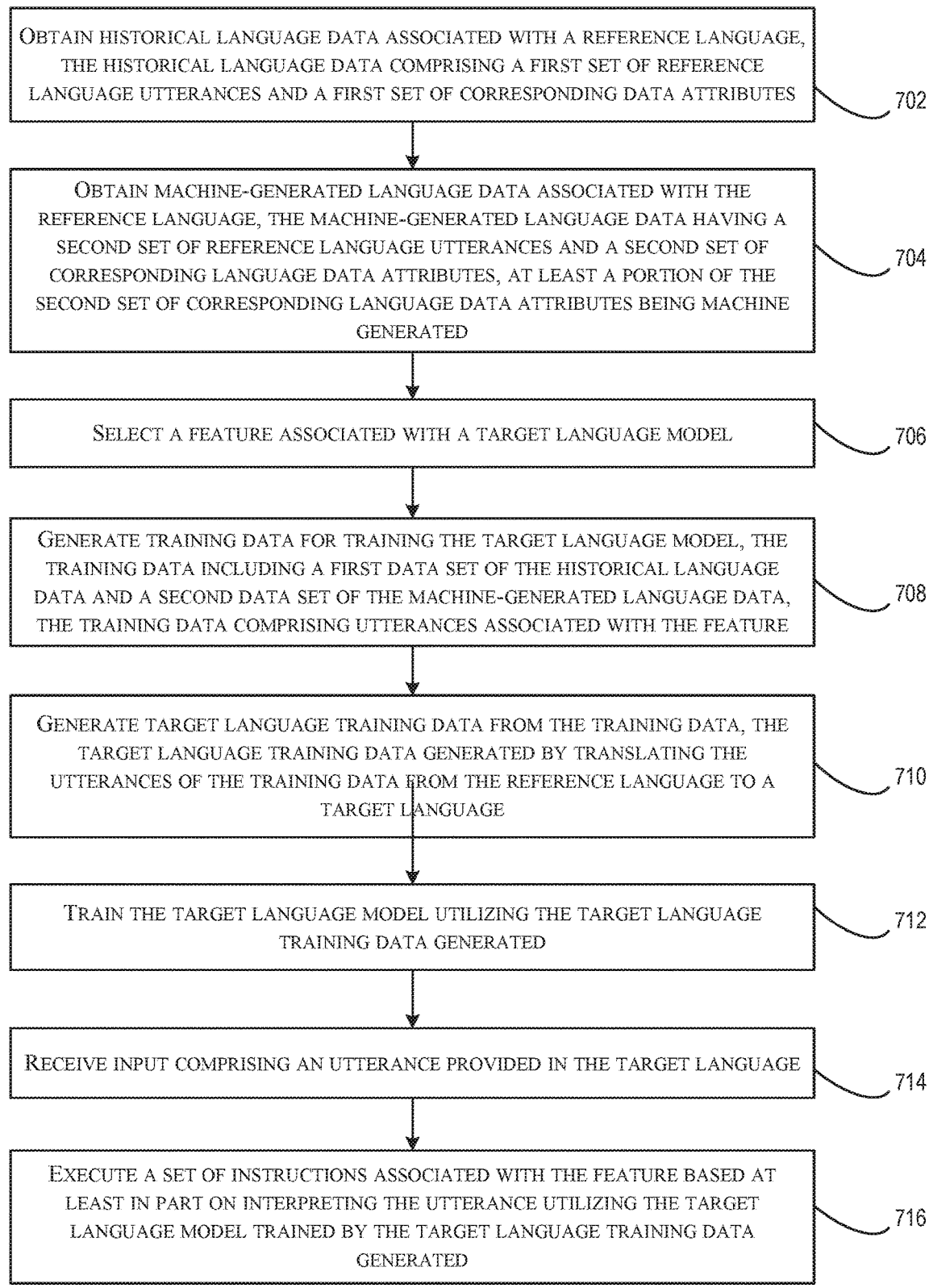
FIG. 7 is a flowchart illustrating an example method for training a target language model, in accordance with at least one embodiment.

FIG. 7 is a flowchart illustrating an example method 700 for training a target language model, in accordance with at least one embodiment. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by a user device (e.g., the user device(s) 504 of FIG. 5) and/or the service provider computer(s) 510, at which at least a portion of the language processing engine 102 is executed.

The method 700 may begin at 702, where historical language data associated with a reference language may be obtained (e.g., by the model manager 626 of FIG. 6). In some embodiments, the historical language data may comprise a first set of reference language utterances (e.g., English utterances) and a first set of corresponding data attributes (e.g., attributes associated with the utterance such as a feature identifier associated with the utterance.

At 704, machine-generated language data associated with the reference language (e.g., English) may be obtained (e.g., by the model manager 626). In some embodiments, the machine-generated language data may have a second set of reference language utterances and a second set of corresponding language data attributes. At least a portion of the second set of corresponding language data attributes may be machine generated (e.g., attributes that were machine generated by the annotation module 622 of FIG. 6). It should be appreciated that, in some embodiments, the second set of reference language utterances may also be machine generated (e.g., by the translation module 624 of FIG. 6).

At 706, a feature associated with a target language model may be selected (e.g., by the model manager 626 during a process for training the target language model). By way of example, a feature corresponding to "Play songs by" may be selected. The feature may be associated with a set of instructions related to executing one or more operations at a user device (e.g., launch a music player application and/or playback functionality, search and/or select songs by a particular artist, play songs via a speaker of the user device in a particular order and/or in a random order, etc.).

At 708, training data may be generated (e.g., by the model manager 626) for training the target language model. In some embodiments, the training data including a first data set of the historical language data and a second data set of the machine-generated language data, the training data comprising utterances associated with the feature. For example, the model manager 626 of FIG. 6 may be configured to combined the first data set of the historical language data (e.g., English data) and the second data set of the machine-generated language data (e.g., also English data) to form a data set for the training data.

At 710, target language training data may be generated (e.g., by the translation module 624 of FIG. 6) from the training data. For example, the target language training data may be generated by translating the utterances of the training data from the reference language (e.g., English) to a target language (e.g., German).

At 712, the target language model may be trained (e.g., by the model manager 626) utilizing the target language training data generated. As described above, the training may utilize any suitable supervised and/or unsupervised machine learning techniques.

At 714, input may be received (e.g., by the data processing module 620). In some embodiments, the input may comprise an utterance provided in the target language (e.g., German). By way of example, a user may submit a German utterance at a user device which in turn may provide the German utterance to the language processing engine 102 via the data processing module 620.

At 716, a set of instructions associated with the feature may be executed (e.g., at the user device) based at least in part on interpreting (e.g., by the model manager 626) the utterance utilizing the target language model trained by the target language training data generated. As a non-limiting example, the model manager 626 may receive the input and provide the input to the target language model. The target language model may provide as output any suitable data such as identification of a feature to be executed in response to receipt of the utterance. The model manager 626 and/or the output module 640 may identify a set of instructions associated with the feature identified by the target language model and provide a command and/or a set of instructions to be executed at the user device. In some embodiments, the output manager 640 may provide data to be presented at the user device and the user device may be configured to identify a set of instructions to be executed to present the data. For example, the output manager 640 may, in some embodiments, provide a list of songs to be played based on a determination that the feature associated with the utterance corresponds to a "Plays songs by" feature. The user device may receive the song list and determine a set of instructions for playing those songs at the user device. In some embodiments, the output manager 640 may provide a command, interpretable by the user device, to play the songs of the song list at the user device. As yet another example, the output manager 640 may provide a set of instructions, executable by the user device, that cause the user device to play the songs of the song list via the user device. In some embodiments, the language processing engine 102 operates in whole, or in part, at the user device and identification and execution of any suitable instructions related to a feature may occur at the user device.

Figure 8:
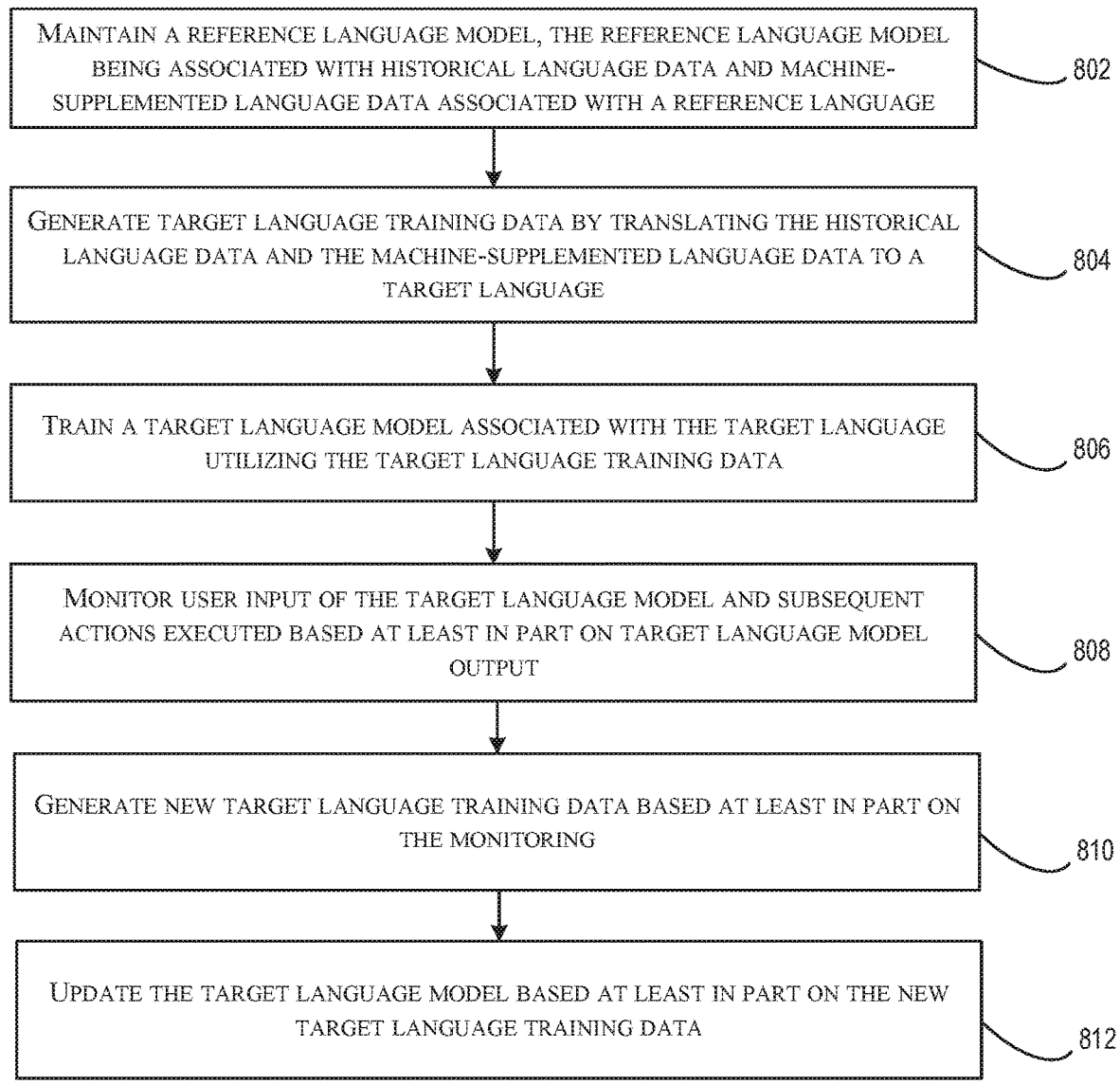
FIG. 8 is a flowchart illustrating another example method for training a target language model, in accordance with at least one embodiment.

FIG. 8 is a flowchart illustrating another example method 800 for training a target language model, in accordance with at least one embodiment. It should be appreciated that the operations of the method 800 may be performed in any suitable, not necessarily the order depicted in FIG. 8. Further, the method 800 may include additional, or fewer operations than those depicted in FIG. 8. The operations of method 700 may be performed by a user device (e.g., the user device(s) 504 of FIG. 5) and/or the service provider computer(s) 510, at which at least a portion of the language processing engine 102 is executed. The operations of method 800 may be stored in a computer-readable storage medium having stored thereon computer-executable instructions that, when executed by a processor, cause the processor to perform operations of method 800. In some embodiments, the method 800 may be performed by a computing device having at least one processor and at least one memory storing computer-readable instructions that, upon execution by the at least one processor, configure the computing device to perform the operations of method 800.

The method 800 may begin at 802, where a reference language model may be maintained (e.g., by the model manager 626 of FIG. 6 and stored at language model data store 610 of FIG. 6). In some embodiments, the reference language model may be associated with historical language data and machine-supplemented language data associated with a reference language (e.g., English).

At 804, target language training data may be generate (e.g., by the translation module 624 of FIG. 6). For example, target language training data may be generated by translating the historical language data and the machine-supplemented language data from a reference language (e.g., English) to a target language (e.g., German).

At 806, a target language model associated with the target language may be trained (e.g., by the model manager 626) utilizing the target language training data. As discussed above, the training of the target language model may utilize any suitable supervised and/or unsupervised machine-learning techniques.

At 808, user input of the target language model and subsequent actions executed based at least in part on target language model output may be monitored (e.g., by the quality manager 628). By way of example, as subsequent user input is provided to the target language model and subsequent actions are executed based on a feature identified by the target language model output, the success of those subsequent actions may be monitored. In some embodiments, a set of success criteria may be retrieved that correspond to the feature identified. The quality manager 628 may determine, based on device data collected after the feature was executed (e.g., 30 seconds after the feature was executed, 1 month after the feature was executed, etc.), a degree of success of the feature executed. For example, the device data may indicate that the feature "Play songs by" was executed by the user device to play a number of songs by a particular artist, and the user listened to a first song for more than 30 seconds. Accordingly to the success criteria associated with that feature, the quality manager 628 may determine that the feature execution was 100% successful. A score may be assigned and/or adjusted and associated with the feature to indicate that, in this case, the feature was successful. Over time, as the feature is executed on more user devices, the success score may be updated/adjusted based on a degree of success of other executions. That is, if the feature is executed at another user device, and the user performed a set of actions to change the song within 30 seconds of execution of the feature, the quality manager 628 may determine that the execution of the feature was unsuccessful and the score may be adjusted to indicate that the execution was unsuccessful for a particular user, a particular number of times, or a particular ratio. For example, the previous success score of 100% may be adjusted to 50% to indicate that half the time the feature executed in response to the utterance was successful, and half the time the feature executed in response to the utterance was unsuccessful.

At 810, new target language training data may be generated (e.g., by the model manager 626, by the quality manager 628, etc.) based at least in part on the monitoring. As a non-limiting example, if the quality manager 628 determines that the feature executed in response to the utterance was successful (e.g., indicated by a success score equal to or greater than a threshold value) the quality manager 628 may include that instance of language data in a new training data set. However, if the quality manager 628 determines that the feature executed in response to the utterance was unsuccessful (e.g., indicated by a success score that less than a threshold value), the quality manager 628 may ensure that that instance of language data is not included in a new training data set.

At 812, the target language model may be updated (e.g., by the model manager 626) based at least in part on the new target language training data. By way of example, the model manager 626 may utilize the new target language training data (e.g., that includes instances of language data that were successful or for which the success may be unknown and excludes instances of language data that were determined to be unsuccessful) to retrain the target language model based on any suitable supervised and/or unsupervised machine learning techniques.

Figure 9:
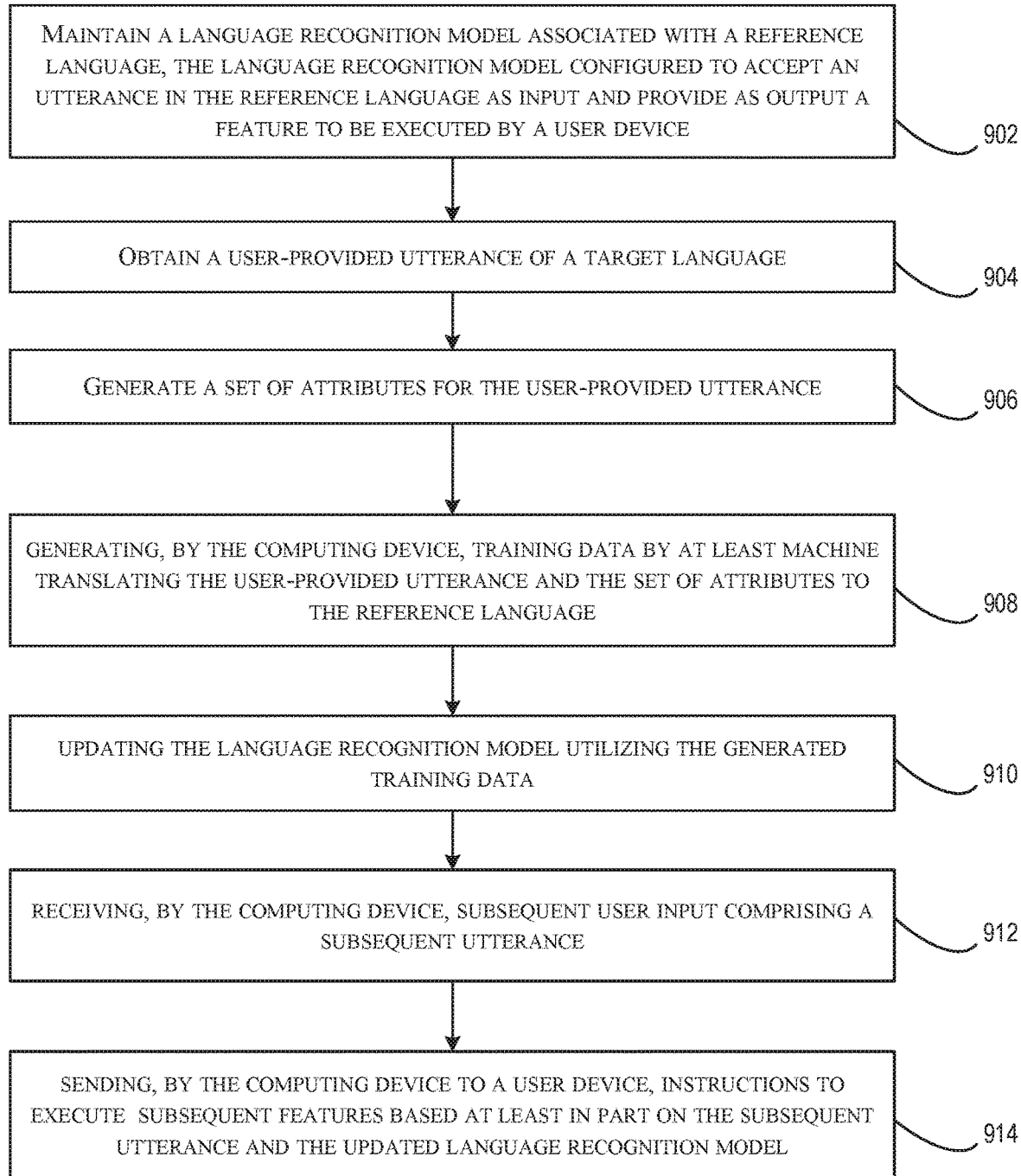
FIG. 9 is a flowchart illustrating an example method for updating a language recognition model trained in a first language to recognize input provided in a second language, in accordance with at least one embodiment.

FIG. 9 is a flowchart illustrating an example method 900 for updating a language recognition model trained in a first language to recognize input provided in a second language, in accordance with at least one embodiment. The operations of method 900 may be performed by a user device (e.g., the user device(s) 504 of FIG. 5) and/or the service provider computer(s) 510, at which at least a portion of the language processing engine 102 is executed. The operations of method 900 may be stored in a computer-readable storage medium having stored thereon computer-executable instructions that, when executed by a processor, cause the processor to perform operations of method 900. In some embodiments, the method 900 may be performed by a computing device having at least one processor and at least one memory storing computer-readable instructions that, upon execution by the at least one processor, configure the computing device to perform the operations of method 900.

The method 900 may begin at 902, where a language recognition model may be maintained (e.g., by the model manager 626 of FIG. 6 and stored within language model data store 610 of FIG. 6). In some embodiments, the language recognition model may be associated with a reference language (e.g., English). The language recognition model may be configured to accept an utterance in the reference language as input and provide as output a feature (e.g., indicated by a feature identifier) to be executed by a user device.

At 904, a user-provided utterance of a target language may be obtained (e.g., by the data processing module 620 of FIG. 6). For example, a user may submit an utterance at a user device (e.g., the user device(s) 504 of FIG. 5). The user device may transmit the utterance to a service provider computer(s) 510 of FIG. 5. Although in some embodiments, the user device may operate some portion of the language processing engine 102 in which case, the user-provided utterance may be processed at the user device itself independent of the service provider computer(s) 510.

At 906, a set of attributes for the user-provided utterance may be generated. For example, the set of attributes may be identified by the annotation module 622 of FIG. 6.

At 908, training data may be generated (e.g., by the translation module 624) by at least machine translating the user-provided utterance and the set of attributes to the reference language. By way of example, the translation module 624 may translate the utterance and the set of attributes from the input language (e.g., German) to the language associated with the language recognition model (e.g., English).

At 910, the language recognition model may be updated utilizing the generated training data. For example, the model manager 626 may utilize the generated training data to retrain the English language recognition model using the English data that was translated from German. The training at the step may comprise any suitable supervised and/or unsupervised machine learning techniques.

At 912, subsequent user input comprising a subsequent utterance may be received (e.g., by the data processing module 620). The subsequent user input may be received in German for example, and the translation module 624 may be configured to translate the subsequent user input from German to English. The translated user input may be submitted to the retrained language recognition model by the model manager 626 to determine a feature to be executed in response to the subsequent utterance.

At 914, instructions to execute one or more subsequent features may be sent based at least in part on the subsequent utterance and the updated language recognition model. For example, the model manager 626 and/or the output module 640 may identify a set of instructions associated with the feature identified by the retrained language recognition model and provide a command and/or a set of instructions to be executed at the user device. In some embodiments, the output manager 640 may provide data to be presented at the user device and the user device may be configured to identify a set of instructions to be executed to present the data. For example, the output manager 640 may, in some embodiments, provide a list of songs to be played based on a determination that the feature associated with the utterance corresponds to a "Plays songs by" feature. The user device may receive the song list and determine a set of instructions for playing those songs at the user device. In some embodiments, the output manager 640 may provide a command, interpretable by the user device, to play the songs of the song list at the user device. As yet another example, the output manager 640 may provide a set of instructions, executable by the user device, that cause the user device to play the songs of the song list via the user device. In some embodiments, the language processing engine 102 operates in whole, or in part, at the user device and identification and execution of any suitable instructions related to a feature may occur at the user device.

Figure 10:
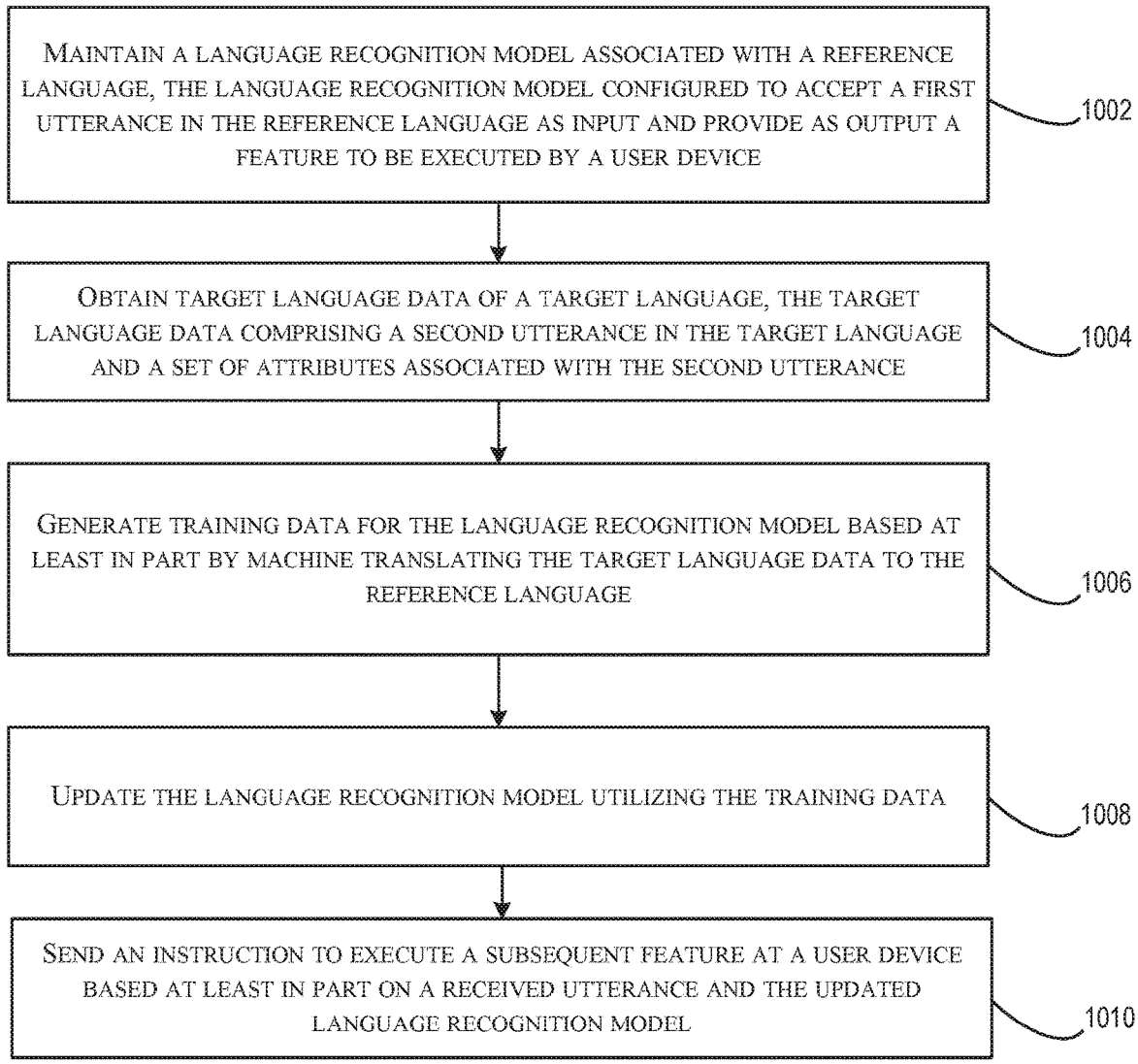
FIG. 10 is a flowchart illustrating another example method for updating a language recognition model trained in a first language to recognize input provided in a second language, in accordance with at least one embodiment.

FIG. 10 is a flowchart illustrating another example method 1000 for updating a language recognition model trained in a first language to recognize input provided in a second language, in accordance with at least one embodiment. The operations of method 1000 may be performed by a user device (e.g., the user device(s) 504 of FIG. 5) and/or the service provider computer(s) 510, at which at least a portion of the language processing engine 102 is executed. The operations of method 1000 may be stored in a computer-readable storage medium having stored thereon computer-executable instructions that, when executed by a processor, cause the processor to perform operations of method 1000. In some embodiments, the method 1000 may be performed by a computing device having at least one processor and at least one memory storing computer-readable instructions that, upon execution by the at least one processor, configure the computing device to perform the operations of method 1000.

The method 1000 may begin at 1002, where a language recognition model may be maintained (e.g., by the model manager 626 of FIG. 6 and stored within language model data store 610 of FIG. 6). In some embodiments, the language recognition model may be associated with a reference language (e.g., English). The language recognition model may be configured to accept an utterance in the reference language as input and provide as output a feature (e.g., indicated by a feature identifier) to be executed by a user device.

At 1004, target language data of a target language may be obtained (e.g., by the data processing module 620 of FIG. 6). In some embodiments, the target language data may comprise a second utterance in the target language (e.g., German) and a set of attributes associated with the second utterance. For example, a user may submit an utterance (e.g., in German) at a user device (e.g., the user device(s) 504 of FIG. 5). The user device may transmit the utterance to a service provider computer(s) 510 of FIG. 5. Although in some embodiments, the user device may operate some portion of the language processing engine 102 in which case, the user-provided utterance may be processed at the user device itself independent of the service provider computer(s) 510. In some embodiments, the set of attributes associated with the German utterance may already exist and/or some portion of the set of attributes associated with the German utterance may be identified by the annotation module 622 of FIG. 6.

At 1006, training data may be generated (e.g., by the translation module 624) based at least in part on machine translating the target language data to the reference language. By way of example, the translation module 624 may translate the utterance and the set of attributes from the input language (e.g., German) to the language associated with the language recognition model (e.g., English).

At 1008, the language recognition model may be updated utilizing the generated training data. For example, the model manager 626 may utilize the generated training data to retrain the English language recognition model using the English data that was translated from the German language data. The training at the step may comprise any suitable supervised and/or unsupervised machine learning techniques.

At 1010, instructions to execute a subsequent feature at a user device may be sent (e.g., by the output module 640 of FIG. 6). These instructions may be identified and/or sent based at least in part on the subsequently received utterance and the updated language recognition model. By way of example, a subsequent German utterance may be received (e.g., by the data processing module 620), translated to English (e.g., by the translation module 624), and provided as input (e.g., by the model manager 626) into the retrained language recognition model. The model manager 626 and/or the output module 640 may identify a set of instructions associated with the feature identified by the output of the retrained language recognition model. Based on the model's output, a command and/or a set of instructions to be executed at the user device (e.g., the user device(s) 504 of FIG. 5) may be provided (e.g., by the output module 640) to the user device. In some embodiments, the output manager 640 may provide data to be presented at the user device and the user device may be configured to identify a set of instructions to be executed to present the data. For example, the output manager 640 may, in some embodiments, provide a list of songs to be played based on a determination that the feature associated with the utterance corresponds to a "Plays songs by" feature. The user device may receive the song list and determine a set of instructions for playing those songs at the user device. In some embodiments, the output manager 640 may provide a command, interpretable by the user device, to play the songs of the song list at the user device. As yet another example, the output manager 640 may provide a set of instructions, executable by the user device, that cause the user device to play the songs of the song list via the user device. In some embodiments, the language processing engine 102 operates in whole, or in part, at the user device and identification and execution of any suitable instructions related to a feature may occur at the user device.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a computing device, a language recognition model associated with a reference language, the language recognition model configured to accept an utterance in the reference language as input and provide as output a feature corresponding to a set of device instructions that, when executed by a user device, cause the feature to be performed by the user device;
   obtaining, by the computing device, a user-provided utterance of a target language;
   generating, by the computing device, an annotation for the user-provided utterance, the annotation identifying the user-provided utterance as being related to a particular feature that corresponds to a particular set of device instructions;
   generating, by the computing device, training data by machine translating the user-provided utterance and the annotation to the reference language;
   updating the language recognition model utilizing the training data and a supervised learning algorithm;
   receiving, by the computing device from a particular user device, subsequent user input comprising a subsequent utterance;
   identifying, by the computing device, device instructions for a corresponding feature to be executed at the particular user device based at least in part on providing the subsequent utterance to the updated language recognition model as input and receiving from the updated language recognition model output identifying the corresponding feature; and
   sending, by the computing device to the particular user device, the device instructions to execute the corresponding feature identified by the update language recognition model.

2. The computer-implemented method of claim 1, wherein the subsequent utterance is provided in either the reference language or the target language, and wherein the method further comprises translating the subsequent utterance from the target language to the reference language when the subsequent utterance is initially provided in the target language.

3. The computer-implemented method of claim 1, wherein the reference language and the target language are different languages.

4. The computer-implemented method of claim 3, further comprising:
   identifying, by the computing device, a frequency at which the user-provided utterance has been historically received as user input;
   obtaining, by the computing device, a success criteria associated with a feature associated with the user-provided utterance;
   calculating, by the computing device, a success score for the user-provided utterance based at least in part on the frequency and the success criteria; and
   excluding, by the computing device, the user-provided utterance or at least one annotation associated with the user-provided utterance from the training data.

5. The computer-implemented method of claim 1, wherein generating the training data further comprises:
   obtaining, by the computing device, historical language data utilized to train the language recognition model,
   identifying, by the computing device, a carrier phrase from the historical language data or the user-provided utterance;
   generating, by the computing device, a plurality of utterances based at least in part on the carrier phrase identified; and
   including, by the computing device, the plurality of utterances in the training data.

6. A computing device, comprising:
   a processor; and
   a memory storing computer-readable instructions that, upon execution by the processor, configure the computing device to:
      maintain a language recognition model associated with a reference language, the language recognition model configured to accept a first utterance in the reference language as input and provide as output a feature corresponding to a set of device instructions that, when executed by a user device, cause the feature to be performed by the user device;
      obtain target language data of a target language, the target language data comprising a second utterance in the target language and an annotation associated with the second utterance, the annotation identifying the second utterance as being related to a particular feature that corresponds to a particular set of device instructions;
      generate training data for the language recognition model based at least in part by machine translating the target language data to the reference language;
      update the language recognition model utilizing the training data and a supervised learning algorithm;
      receive, from a particular user device, a subsequent utterance; and
      send device instructions to execute a corresponding feature at the particular user device based at least in part on a providing the subsequent utterance to the updated language recognition model as input, and receiving from the updated language recognition model output identifying the corresponding feature.

7. The computing device of claim 6, wherein the computing device is further configured to:
   deploy the updated language recognition model to a plurality of user devices;
   obtain, from the user device, user input of the target language, the user input comprising an utterance provided by a user, the utterance being in the target language;
   translate the user input from the target language to the reference language;
   provide the translated user input to the language recognition model;
   receive output of the language recognition model, the output indicating a particular feature to be executed by the user device; and
   send instructions for the particular feature to be executed by the user device.

8. The computing device of claim 7, wherein the computing device is further configured to:
   identify success criteria associated with the feature executed by the user device;
   determine that the feature executed by the user device was incorrect based at least in part on the success criteria; and
   request feedback from the user device related to the user input.

9. The computing device of claim 8, wherein requesting feedback from the user device further comprises:
   identifying a number of questions related to at least one attribute associated with user input; and
   providing at least one of the number of questions to the user device.

10. The computing device of claim 9, wherein the computing device is further configured to:
    receive at least one answer corresponding the at least one of the number of questions presented to the user device;
    determine whether one or more attributes associated with the user input is inaccurate based at least in part on the at least one answer; and
    modify the one or more attributes based at least in part on determining that the one or more attributes associated with the user input is inaccurate.

11. The computing device of claim 10, wherein the computing device is further configured to further update the updated language recognition model based at least in part on the one or more attributes that were modified.

12. The computing device of claim 6, wherein the computing device is further configured to:
    deploy the updated language recognition model to a plurality of user devices;
    obtain, from the user device, user input of the target language, the user input comprising an utterance provided by a user, the utterance being in the target language;
    translate the user input from the target language to the reference language;
    identify success criteria associated with a particular feature executed based on the user input;
    determine that the particular feature executed by a user device was incorrect based at least in part on the success criteria; and
    exclude the user input from subsequent training data utilized to further update the updated language recognition model.

13. The computing device of claim 6, wherein the computing device is further configured to:
- obtain historical language data utilized to train the language recognition model;
- identify a carrier phrase from the historical language data or the training data;
- generate a plurality of utterances based at least in part on the carrier phrase identified; and
- include the plurality of utterances in the training data.

14. The computing device of claim 13, wherein the plurality of utterances are generated by:
- identifying a set of catalog attributes from catalog data; and
- combining the identified carrier phrase with each attribute of the set of catalog attributes to generate the plurality of utterances.

15. A computer-readable storage medium having stored thereon computer-executable instructions that, when executed by a processor, cause the processor to perform operations comprising:
- maintaining a language recognition model associated with a reference language, the language recognition model configured to accept a first utterance in the reference language as input and provide as output a feature corresponding to a set of device instructions that, when executed by a user device, cause the feature to be performed by the user device;
- obtaining target language data of a target language, the target language data comprising a second utterance in the target language and an annotation associated with the second utterance, the annotation identifying the second utterance as corresponding to a particular feature that is associated with a particular set of device instructions;
- generating training data for the language recognition model based at least in part by machine translating the target language data to the reference language;
- updating the language recognition model utilizing the training data;
- receiving, from a particular user device, a subsequent utterance; and
- sending device instructions to execute a corresponding feature at the particular user device based at least in part on a providing the subsequent utterance to the updated language recognition model as input, and receiving from the updated language recognition model output identifying the corresponding feature.

16. The computer-readable storage medium of claim 15, wherein the processor performs additional operations comprising:
- obtaining a user-provided translation in the target language, the user-provided translation being associated with the target language data;
- comparing the user-provided translation to a machine-provided translation of the training data; and
- excluding the machine-provided translation from the training data based at least in part on comparing the user-provided translation to the machine-provided translation of the training data.

17. The computer-readable storage medium of claim 15, wherein the processor performs additional operations comprising:
- monitoring user input of the updated language recognition model and the subsequent actions executed based at least in part on output of the updated language recognition model;
- identifying success criteria of a subsequent action executed in response to a particular user input of the updated language recognition model;
- determining that the subsequent action was incorrectly executed in response to the particular user input, wherein determining that the subsequent action was incorrectly executed is based at least in part on the success criteria identified; and
- excluding data corresponding to the particular user input and the subsequent action from new target language training data based at least in part on determining that the subsequent action was incorrectly executed.

18. The computer-readable storage medium of claim 15, wherein the language recognition model is maintained and updated at the user device.

19. The computer-readable storage medium of claim 15, wherein the annotation associated with the second utterance comprises a feature identifier of the user device.

20. The computer-readable storage medium of claim 19, wherein the feature identifier is associated with a set of instructions that are executable by the user device.

21. The computer-readable storage medium of claim 20, wherein the processor performs additional operations comprising:
- maintaining a plurality of language recognition models associated with respective reference languages; and
- selecting the language recognition model from the plurality of language recognition models based at least in part on a predetermined association between the reference language and the target language.

* * * * *